US008677152B2

(12) United States Patent
Kahn et al.

(10) Patent No.: US 8,677,152 B2
(45) Date of Patent: Mar. 18, 2014

(54) METHOD AND APPARATUS FOR ENCRYPTING MEDIA PROGRAMS FOR LATER PURCHASE AND VIEWING

(75) Inventors: Raynold M. Kahn, Los Angeles, CA (US); Gregory J. Gagnon, Torrance, CA (US); David D. Ha, San Gabriel, CA (US); Peter M. Klauss, Torrance, CA (US); Christopher P. Curren, Brentwood, CA (US); Ronald P. Cocchi, Seal Beach, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 12/172,901

(22) Filed: Jul. 14, 2008

(65) Prior Publication Data
US 2008/0279386 A1 Nov. 13, 2008

Related U.S. Application Data

(62) Division of application No. 09/960,824, filed on Sep. 21, 2001, now Pat. No. 7,409,562.

(51) Int. Cl.
*H04L 9/28* (2006.01)
*H04L 9/14* (2006.01)

(52) U.S. Cl.
USPC .............................. 713/193; 380/283; 705/56

(58) Field of Classification Search
None
See application file for complete search history.

(56) References Cited

U.S. PATENT DOCUMENTS

| 3,794,922 | A | 2/1974 | Osborn et al. |
| 3,885,089 | A | 5/1975 | Callais et al. |
| 4,881,264 | A | 11/1989 | Merkle |
| 4,941,176 | A | 7/1990 | Matyas et al. |
| 5,029,207 | A | 7/1991 | Gammie |
| 5,036,461 | A | 7/1991 | Elliott et al. |
| 5,068,894 | A | 11/1991 | Hoppe |
| 5,105,268 | A | 4/1992 | Yamanouchi et al. |
| 5,111,504 | A | 5/1992 | Esserman et al. |
| 5,191,410 | A | 3/1993 | McCalley et al. |
| 5,301,245 | A | 4/1994 | Endoh |
| 5,421,031 | A | 5/1995 | De Bey |

(Continued)

FOREIGN PATENT DOCUMENTS

| EA | 0002703 | 8/2002 |
| EP | 0912052 | 4/1999 |

(Continued)

OTHER PUBLICATIONS

Non-final Office Action dated Apr. 23, 2009 in U.S. Appl. No. 09/620,833, filed Jul. 21, 2000 by Raynold M. Kahn et al.

(Continued)

*Primary Examiner* — Christopher Revak

(57) ABSTRACT

A system and method for storing and retrieving program material for subsequent replay is disclosed. The method includes accepting a receiver ID associated with a receiver key stored in a memory of the receiver, determining a pairing key for encrypting communications between the conditional access module and the receiver, encrypting the pairing key with the receiver key, and transmitting a message comprising the encrypted pairing key to the receiver. The apparatus comprises a receiver for receiving a data stream transmitting a media program encrypted according to a media encryption key and an encrypted media encryption key and a conditional access module, communicatively coupleable with the receiver.

78 Claims, 16 Drawing Sheets

(56) References Cited

U.S. PATENT DOCUMENTS

| | | |
|---|---|---|
| 5,442,389 A | 8/1995 | Blahut et al. |
| 5,485,221 A | 1/1996 | Banker et al. |
| 5,506,902 A | 4/1996 | Kubota |
| 5,559,549 A | 9/1996 | Hendricks et al. |
| 5,566,353 A | 10/1996 | Cho et al. |
| 5,590,200 A | 12/1996 | Nachman et al. |
| 5,592,212 A | 1/1997 | Handelman |
| 5,664,046 A | 9/1997 | Abecassis |
| RE35,651 E | 11/1997 | Bradley et al. |
| 5,684,742 A | 11/1997 | Bublitz et al. |
| 5,701,582 A | 12/1997 | De Bey |
| 5,790,783 A | 8/1998 | Lee et al. |
| 5,805,699 A * | 9/1998 | Akiyama et al. ............. 705/58 |
| 5,848,158 A | 12/1998 | Saito et al. |
| 5,867,579 A | 2/1999 | Saito |
| 5,889,941 A | 3/1999 | Tushie et al. |
| 5,892,535 A | 4/1999 | Allen et al. |
| 6,041,056 A | 3/2000 | Bigham et al. |
| 6,069,647 A | 5/2000 | Sullivan et al. |
| 6,105,134 A | 8/2000 | Pinder et al. |
| 6,154,206 A | 11/2000 | Ludtke |
| 6,157,719 A | 12/2000 | Wasilewski et al. |
| 6,226,618 B1 | 5/2001 | Downs et al. |
| 6,266,480 B1 | 7/2001 | Ezaki et al. |
| 6,286,008 B1 * | 9/2001 | Matsumoto et al. ............... 1/1 |
| 6,298,441 B1 | 10/2001 | Handelman et al. |
| 6,370,318 B1 | 4/2002 | Iwaki |
| 6,381,747 B1 * | 4/2002 | Wonfor et al. ............. 725/104 |
| 6,418,424 B1 | 7/2002 | Hoffberg et al. |
| 6,424,717 B1 | 7/2002 | Pinder et al. |
| 6,424,947 B1 | 7/2002 | Tsuria et al. |
| 6,442,525 B1 | 8/2002 | Silverbrook et al. |
| 6,466,671 B1 | 10/2002 | Maillard et al. |
| 6,510,519 B2 | 1/2003 | Wasilewski et al. |
| 6,519,693 B1 | 2/2003 | De Bey |
| 6,539,548 B1 | 3/2003 | Hendricks et al. |
| 6,574,609 B1 | 6/2003 | Downs et al. |
| 6,588,017 B1 | 7/2003 | Calderone |
| 6,588,673 B1 | 7/2003 | Chan et al. |
| 6,668,377 B1 | 12/2003 | Dunn |
| 6,714,650 B1 | 3/2004 | Maillard et al. |
| 6,748,080 B2 | 6/2004 | Russ et al. |
| 6,804,357 B1 | 10/2004 | Ikonen et al. |
| 6,853,728 B1 | 2/2005 | Kahn et al. |
| 6,889,208 B1 | 5/2005 | Okabe et al. |
| 6,912,513 B1 * | 6/2005 | Candelore ............. 705/51 |
| 6,985,591 B2 * | 1/2006 | Graunke ............. 380/277 |
| 6,993,499 B2 | 1/2006 | Gagnon et al. |
| 7,007,170 B2 * | 2/2006 | Morten ............. 713/193 |
| 7,036,011 B2 * | 4/2006 | Grimes et al. ............. 713/156 |
| 7,058,802 B1 | 6/2006 | Epstein et al. |
| 7,099,946 B2 * | 8/2006 | Lennon et al. ............. 709/227 |
| 7,177,911 B2 | 2/2007 | deCarmo |
| 7,228,439 B2 | 6/2007 | Sasselli |
| 7,231,450 B1 | 6/2007 | Clifford et al. |
| 7,239,709 B1 | 7/2007 | Yamada et al. |
| 7,277,928 B2 * | 10/2007 | Lennon ............. 709/219 |
| 7,298,849 B2 * | 11/2007 | Graunke ............. 380/277 |
| 7,328,455 B2 * | 2/2008 | Jutzi et al. ............. 726/26 |
| 7,395,545 B2 * | 7/2008 | Wonfor et al. ............. 725/25 |
| 7,403,618 B2 | 7/2008 | Van Rijnsoever et al. |
| 7,461,249 B1 | 12/2008 | Pearson et al. |
| 7,492,897 B1 | 2/2009 | Eskicioglu et al. |
| 7,539,307 B2 | 5/2009 | Lotspiech et al. |
| 7,580,523 B2 * | 8/2009 | Kahn et al. ............. 380/240 |
| 7,797,552 B2 * | 9/2010 | Kahn et al. ............. 713/193 |
| 8,050,406 B2 * | 11/2011 | Pedlow, Jr. ............. 380/277 |
| 8,140,859 B1 | 3/2012 | Kahn et al. |
| 8,165,302 B2 * | 4/2012 | Pedlow, Jr. ............. 380/277 |
| 8,243,925 B2 * | 8/2012 | Cocchi et al. ............. 380/228 |
| 8,250,597 B2 * | 8/2012 | Wonfor et al. ............. 725/31 |
| 2002/0002674 A1 * | 1/2002 | Grimes et al. ............. 713/156 |
| 2002/0013948 A1 | 1/2002 | Aguayo, Jr. et al. |
| 2002/0094084 A1 | 7/2002 | Wasilewski et al. |
| 2002/0162104 A1 | 10/2002 | Raike et al. |
| 2002/0166121 A1 | 11/2002 | Rovira |
| 2002/0169971 A1 | 11/2002 | Asano et al. |
| 2003/0005285 A1 | 1/2003 | Graunke |
| 2003/0005429 A1 | 1/2003 | Colsey |
| 2003/0018968 A1 | 1/2003 | Avnet |
| 2003/0026428 A1 | 2/2003 | Loisel |
| 2003/0088876 A1 | 5/2003 | Mao et al. |
| 2003/0097622 A1 | 5/2003 | Liu et al. |
| 2003/0122966 A1 | 7/2003 | Markman et al. |
| 2003/0131349 A1 | 7/2003 | Kuczynski-Brown |
| 2003/0131353 A1 * | 7/2003 | Blom et al. ............. 725/25 |
| 2003/0156649 A1 | 8/2003 | Abrams, Jr. |
| 2003/0177365 A1 | 9/2003 | Buhan et al. |
| 2003/0188164 A1 | 10/2003 | Okimoto |
| 2003/0190149 A1 | 10/2003 | Chang et al. |
| 2003/0196204 A1 | 10/2003 | Thiagarajan et al. |
| 2003/0229898 A1 | 12/2003 | Babu et al. |
| 2003/0229900 A1 | 12/2003 | Reisman |
| 2004/0032950 A1 | 2/2004 | Graunke |
| 2004/0068747 A1 | 4/2004 | Robertson et al. |
| 2004/0073954 A1 | 4/2004 | Bjordammen et al. |
| 2004/0088558 A1 | 5/2004 | Candelore |
| 2004/0148634 A1 | 7/2004 | Arsenault et al. |
| 2004/0168071 A1 | 8/2004 | Silverbrook |
| 2004/0190721 A1 | 9/2004 | Barrett et al. |
| 2004/0260798 A1 | 12/2004 | Addington et al. |
| 2004/0261126 A1 | 12/2004 | Addington et al. |
| 2005/0005286 A1 | 1/2005 | Koskela et al. |
| 2005/0039025 A1 | 2/2005 | Main et al. |
| 2005/0061884 A1 | 3/2005 | Stewart |
| 2005/0071280 A1 | 3/2005 | Irwin et al. |
| 2005/0084102 A1 | 4/2005 | Hollar |
| 2005/0089162 A1 * | 4/2005 | Kobayashi ............. 380/44 |
| 2005/0091681 A1 | 4/2005 | Borden et al. |
| 2005/0107157 A1 | 5/2005 | Wachtfogel et al. |
| 2005/0108519 A1 | 5/2005 | Barton et al. |
| 2005/0144248 A1 | 6/2005 | Doganowski et al. |
| 2005/0144468 A1 | 6/2005 | Northcutt et al. |
| 2005/0169468 A1 | 8/2005 | Fahrny et al. |
| 2005/0182931 A1 | 8/2005 | Robert et al. |
| 2005/0183112 A1 | 8/2005 | Duval |
| 2005/0195975 A1 | 9/2005 | Kawakita |
| 2005/0204391 A1 | 9/2005 | Hunleth et al. |
| 2005/0216942 A1 | 9/2005 | Barton |
| 2005/0235361 A1 | 10/2005 | Alkove et al. |
| 2005/0246372 A1 * | 11/2005 | Yamaki ............. 707/104.1 |
| 2005/0249350 A1 | 11/2005 | Kahn et al. |
| 2006/0015750 A1 | 1/2006 | Ashley et al. |
| 2006/0031873 A1 * | 2/2006 | Fahrny et al. ............. 725/31 |
| 2006/0039560 A1 | 2/2006 | Wasilewski |
| 2006/0039565 A1 * | 2/2006 | Kim et al. ............. 380/277 |
| 2006/0288426 A1 | 12/2006 | Saito |
| 2007/0092077 A1 * | 4/2007 | Yoshida et al. ............. 380/201 |
| 2007/0092078 A1 * | 4/2007 | Yoshida et al. ............. 380/201 |
| 2007/0198414 A1 | 8/2007 | Derrenberger |
| 2012/0275599 A1 * | 11/2012 | Cocchi et al. ............. 380/270 |

FOREIGN PATENT DOCUMENTS

| | | |
|---|---|---|
| EP | 0936812 A1 | 8/1999 |
| EP | 1418701 | 5/2004 |
| JP | 04175025 | 6/1992 |
| JP | 4-288743 | 10/1992 |
| JP | 05284499 | 10/1993 |
| JP | 8-125651 | 5/1996 |
| JP | 8-125651 A | 5/1996 |
| JP | 08125651 A | 5/1996 |
| JP | 8287014 | 11/1996 |
| JP | 10-13784 | 1/1998 |
| JP | 10013784 | 1/1998 |
| JP | 11-232776 | 8/1999 |
| JP | 11232776 | 8/1999 |
| JP | 2000-122539 | 4/2000 |
| JP | 2000122933 A | 4/2000 |
| JP | 2001-203686 | 7/2001 |
| WO | WO 91/11884 | 8/1991 |
| WO | WO 98/56180 | 12/1998 |
| WO | 9907150 A1 | 2/1999 |
| WO | 9909743 | 2/1999 |

(56) References Cited

FOREIGN PATENT DOCUMENTS

| WO | 99/41907 A1 | 8/1999 | | |
|---|---|---|---|---|
| WO | WO 99/43120 | 8/1999 | | |
| WO | 0008909 A2 | 2/2000 | | |
| WO | 00/56068 A1 | 9/2000 | | |
| WO | 0062505 A1 | 10/2000 | | |
| WO | WO 01/17159 | 3/2001 | | |
| WO | 0165762 | 9/2001 | | |
| WO | WO 01/82600 | 11/2001 | | |
| WO | WO 01/98903 A1 * | 12/2001 | ............. | G06F 11/30 |
| WO | WO 02/063879 | 8/2002 | | |
| WO | WO 03/101105 | 12/2003 | | |
| WO | 2004/014075 A2 | 2/2004 | | |
| WO | WO 2004/017637 | 2/2004 | | |
| WO | WO 2004/057871 | 7/2004 | | |
| WO | WO 2004/082286 | 9/2004 | | |

OTHER PUBLICATIONS

U.S. Appl. No. 09/620,772, filed Jul. 21, 2000, Kahn et al.
U.S. Appl. No. 09/620,773, filed Jul. 21, 2000, Kahn et al.
U.S. Appl. No. 09/620,833, filed Jul. 21, 2000, Kahn et al.
U.S. Appl. No. 09/621,476, filed Jul. 21, 2000, Kahn et al.
U.S. Appl. No. 10/003,545, filed Oct. 24, 2001, Kahn et al.
U.S. Appl. No. 11/205,249, filed Aug. 16, 2005, James et al.
Notice of Allowance dated Oct. 19, 2006 in U.S. Appl. No. 09/621,476, filed Jul. 21, 2000 by Raynold M. Kahn et al., now issued Apr. 10, 2007 as U.S. Patent No. 7,203,311.
Non-final Office Action dated Jul. 14, 2005 in U.S. Appl. No. 09/621,476, filed Jul. 21, 2000 by Raynold M. Kahn et al., now issued Apr. 10, 2007 as U.S. Patent No. 7,203,311.
Non-final Office Action dated Jan. 27, 2005 in U.S. Appl. No. 09/621,476, filed Jul. 21, 2000 by Raynold M. Kahn et al., now issued Apr. 10, 2007 as U.S. Patent No. 7,203,311.
Non-final Office Action dated May 24, 2004 in U.S. Appl. No. 09/621,476, filed Jul. 21, 2000 by Raynold M. Kahn et al., now issued Apr. 10, 2007 as U.S. Patent No. 7,203,311.
EPO Communication dated Apr. 25, 2007 in European counterpart Application No. 01 117 554.4 corresponding to U.S. Appl. No. 09/621,476, filed Jul. 21, 2000 by Raynold M. Kahn et al., now issued Apr. 10, 2007 as U.S. Patent No. 7,203,311.
EPO Communication dated Sep. 14, 2004 in European counterpart Application No. 01 117 554.4 corresponding to U.S. Appl. No. 09/621,476, filed Jul. 21, 2000 by Raynold M. Kahn et al., now issued Apr. 10, 2007 as U.S. Patent No. 7,203,311.
Japanese Decision of Rejection dated Dec. 14, 2004 in Japanese counterpart Application No. 2001-222222 corresponding to U.S. Appl. No. 09/621,476, filed Jul. 21, 2000 by Raynold M. Kahn et al., now issued Apr. 10, 2007 as U.S. Patent No. 7,203,311.
Japanese Office Action dated Aug. 17, 2004 in Japanese counterpart Application No. 2001-222222 corresponding to U.S. Appl. No. 09/621,476, filed Jul. 21, 2000 by Raynold M. Kahn et al., now issued Apr. 10, 2007 as U.S. Patent No. 7,203,311.
"Introduction to Encryption Theory"; published by Kyoritsu Shuppan Co.; Feb. 25, 1993; p. 110.
Non-final Office Action dated Mar. 17, 2008 in U.S. Appl. No. 10/701,800, filed Feb. 2, 2007 by Raynold M. Kahn et al.
Notices of Allowability dated Dec. 5, 2007, Sep. 27, 2007, Jun. 6, 2007, Feb. 7, 2007, Nov. 7, 2006, Sep. 20, 2006, Apr. 24, 2006, Nov. 8, 2005 and Feb. 11, 2005 in U.S. Appl. No. 09/620,833, filed Jul. 21, 2000 by Raynold M. Kahn et al.
Non-final Office Action dated Apr. 23, 2004 in U.S. Appl. No. 09/620,833, filed Jul. 21, 2000 by Raynold M. Kahn et al.
EPO Notice of Allowance dated Oct. 29, 2007 in European counterpart Application No. 01 117 556.9 corresponding to U.S. Appl. No. 09/620,833, filed Jul. 21, 2000 by Raynold M. Kahn et al.
EPO Communication dated Mar. 5, 2007 in European counterpart Application No. 01 117 556.9 corresponding to U.S. Appl. No. 09/620,833, filed Jul. 21, 2000 by Raynold M. Kahn et al.
EPO Communication dated Sep. 14, 2004 in European counterpart Application No. 01 117 556.9 corresponding to U.S. Appl. No. 09/620,833, filed Jul. 21, 2000 by Raynold M. Kahn et al.
Japanese Decision of Rejection dated Dec. 14, 2004 in Japanese counterpart Application No. 2001-222191 corresponding to U.S. Appl. No. 09/620,833, filed Jul. 21, 2000 by Raynold M. Kahn et al.
Japanese Office Action dated Aug. 17, 2004 in Japanese counterpart Application No. 2001-222191 corresponding to U.S. Appl. No. 09/620,833, filed Jul. 21, 2000 by Raynold M. Kahn et al.
Notice of Allowance dated Dec. 5, 2006 in U.S. Appl. No. 09/620,773, filed Jul. 21, 2000 by Raynold M. Kahn et al., now issued Apr. 10, 2007 as U.S. Patent No. 7,203,314.
Non-final Office Action dated Jul. 19, 2006 in U.S. Appl. No. 09/620,773, filed Jul. 21, 2000 by Raynold M. Kahn et al., now issued Apr. 10, 2007 as U.S. Patent No. 7,203,314.
Notice of Allowance dated Mar. 11, 2005 in U.S. Appl. No. 09/620,773, filed Jul. 21, 2000 by Raynold M. Kahn et al., now issued Apr. 10, 2007 as U.S. Patent No. 7,203,314.
Non-final Office Action dated Aug. 25, 2004 in U.S. Appl. No. 09/620,773, filed Jul. 21, 2000 by Raynold M. Kahn et al., now issued Apr. 10, 2007 as U.S. Patent No. 7,203,314.
Non-final Office Action dated Feb. 26, 2004 in U.S. Appl. No. 09/620,773, filed Jul. 21, 2000 by Raynold M. Kahn et al., now issued Apr. 10, 2007 as U.S. Patent No. 7,203,314.
Non-final Office Action dated Jul. 26, 2007 in U.S. Appl. No. 09/620,772, filed Jul. 21, 2000 by Raynold M. Kahn et al.
Non-final Office Action dated Jan. 22, 2007 in U.S. Appl. No. 09/620,772, filed Jul. 21, 2000 by Raynold M. Kahn et al.
Non-final Office Action dated Aug. 15, 2006 in U.S. Appl. No. 09/620,772, filed Jul. 21, 2000 by Raynold M. Kahn et al.
Notice of Allowance dated May 10, 2005 in U.S. Appl. No. 09/620,772, filed Jul. 21, 2000 by Raynold M. Kahn et al.
Non-final Office Action dated Oct. 20, 2004 in U.S. Appl. No. 09/620,772, filed Jul. 21, 2000 by Raynold M. Kahn et al.
Non-final Office Action dated Mar. 1, 2004 in U.S. Appl. No. 09/620,772, filed Jul. 21, 2000 by Raynold M. Kahn et al.
Japanese Decision of Rejection dated Mar. 7, 2006 in Japanese counterpart Application No. 2001-222227 corresponding to U.S. Appl. No. 09/620,772, filed Jul. 21, 2000 by Raynold M. Kahn et al.
Japanese Office Action dated Aug. 17, 2004 in Japanese counterpart Application No. 2001-222227 corresponding to U.S. Appl. No. 09/620,772, filed Jul. 21, 2000 by Raynold M. Kahn et al.
EPO Notice of Allowance dated Nov. 22, 2007 in European counterpart Application No. 01 117 555.1 of U.S. Appl. No. 09/620,772, filed Jul. 21, 2000 by Raynold M. Kahn et al.
EPO Minutes of the Oral Proceedings dated Nov. 16, 2007 in European counterpart Application No. 01 117 555.1 corresponding to U.S. Appl. No. 09/620,772, filed Jul. 21, 2000 by Raynold M. Kahn et al.
EPO Summons to Attend Oral Proceedings dated Mar. 26, 2007 in European counterpart Application No. 01 117 555.1 corresponding to U.S. Appl. No. 09/620,772, filed Jul. 21, 2000 by Raynold M. Kahn et al.
EPO Communication dated Sep. 17, 2004 in European counterpart Application No. 01 117 555.1 corresponding to U.S. Appl. No. 09/620,772, filed Jul. 21, 2000 by Raynold M. Kahn et al.
Notice of Allowance dated Sep. 22, 2004 in U.S. Appl. No. 09/620,832, filed Jul. 21, 2000 by Raynold M. Kahn et al., now issued Feb. 8, 2005 as U.S. Patent No. 6,853,728.
Non-final Office Action dated Sep. 11, 2003 in U.S. Appl. No. 09/620,832, filed Jul. 21, 2000 by Raynold M. Kahn et al., now issued Feb. 8, 2005 as U.S. Patent No. 6,853,728.
Japanese Decision of Rejection dated Feb. 8, 2005 in Japanese counterpart Application No. 2001-222229 corresponding to U.S. Appl. No. 09/620,832, filed Jul. 21, 2000 by Raynold M. Kahn et al., now issued Feb. 8, 2005 as U.S. Patent No. 6,853,728.
Japanese Office Action dated Jul. 6, 2004 in Japanese counterpart Application No. 2001-222229 corresponding to U.S. Appl. No. 09/620,832, filed Jul. 21, 2000 by Raynold M. Kahn et al., now issued Feb. 8, 2005 as U.S. Patent No. 6,853,728.
EPO Decision of Refusal dated Mar. 8, 2007 in European counterpart Application No. 01 117 553.6 corresponding to U.S. Appl. No. 09/620,832, filed Jul. 21, 2000 by Raynold M. Kahn et al., now issued Feb. 8, 2005 as U.S. Patent No. 6,853,728.

(56) References Cited

OTHER PUBLICATIONS

EPO Communication dated Sep. 14, 2004 in European counterpart Application No. 01 117 553.6 corresponding to U.S. Appl. No. 09/620,832, filed Jul. 21, 2000 by Raynold M. Kahn et al., now issued Feb. 8, 2005 as U.S. Patent No. 6,853,728.
RSA Laboratories; "PKCS #1 v2.1: RSA Cryptography Standard"; Jun. 14, 2002; 61 pages.
Written Opinion dated Sep. 16, 2003 in International counterpart Application No. PCT/US02/29944 corresponding to U.S. Appl. No. 09/960,824, filed Sep. 21, 2001 by Raynold M. Kahn et al.
EPO Official Communication dated Oct. 15, 2007 in European counterpart Application No. 02789164.7 corresponding to U.S. Appl. No. 09/960,824, filed Sep. 21, 2001 by Raynold M. Kahn et al.
Japanese Office Action dated Mar. 27, 2007 in Japanese counterpart Application No. 2003-535391 corresponding to U.S. Appl. No. 09/960,824, filed Sep. 21, 2001 by Raynold M. Kahn et al.
Notice of Allowance dated Sep. 12, 2008 in U.S. Appl. No. 11/701,800, filed Feb. 2, 2007 by Raynold Kahn et al.
Summons to attend Oral Proceedings dated Sep. 24, 2008 in European patent Application No. 01117554.4 filed Jul. 20, 2001 by Raynold M. Kahn et al.
Non-final Office action dated Aug. 20, 2009 in U.S. Appl. No. 11/654,752, filed Jan. 18, 2007 by Raynold M. Kahn et al.
Non-final Office action dated Nov. 6, 2009 in U.S. Appl. No. 12/184,957, filed Aug. 1, 2008 by Raynold M. Kahn et al.
Japanese Office Action dated Jun. 17, 2008 in Japanese counterpart Application No. 2001-222222 corresponding to U.S. Appl. No. 09/621,476, filed Jul. 21, 2000 by Raynold M. Kahn et al., now issued Apr. 10, 2007 as US Patent No. 7,203,311.
Japanese Office Action dated Feb. 17, 2009 in Japanese Patent Application No. 2001-222227 filed Jul. 23, 2001 by Raynold M. Kahn et al.
Japanese Office Action dated Nov. 11, 2008 in Japanese Patent Application No. 2001-222222 filed Jul. 23, 2001 by Raynold M. Kahn et al.
Non-final Office action dated Mar. 30, 2010 in U.S. Appl. No. 09/620,833, filed Jul. 21, 2000 by Raynold M. Kahn et al.
English translation of Appeal Decision of Rejection dated Oct. 13, 2009 in Japanese Patent Application No. 2001-222227, filed Jul. 23, 2001 by Raynold M. Kahn et al.; 16 pages.
Notice of Allowance dated May 12, 2010 in U.S. Appl. No. 12/184,957, filed Aug. 1, 2008 by Raynold M. Kahn et al.
Final Rejection dated Aug. 12, 2010 in U.S. Appl. No. 09/620,833, filed Jul. 21, 2000 by Raynold M. Kahn et al.
Japanese Office action dated Sep. 7, 2010 in Japanese divisional Patent Application No. 2007-167743 filed Jun. 26, 2007 by Raynold M. Kahn et al.
Japanese Office action dated Sep. 7, 2010 in Japanese divisional Patent Application 2007-167744 filed Jun. 26, 2007 by Raynold M. Kahn et al.
EPO Communication dated Oct. 6, 2010 in European Patent Application No. 02789164.7 filed Sep. 20, 2002 by Raynold M. Kahn et al.
Non-final Office action dated Nov. 30, 2010 in U.S. Appl. No. 09/620,833, filed Jul. 21, 2000 by Reynold M. Kahn et al.
Partial machine translation from Japanese Patent Office generated Oct. 12, 2010 of Japanese Patent JP3429660B granted Jul. 22, 2003 by Yamada et al./Matsushita Electric Ind. Co. (previously cited Jun. 30, 2010 as English abstract of Japanese Publication No. 11232776A).
Japanese Decision of Rejection dated Mar. 29, 2011 in Japanese Patent Application No. 2007-167743 filed Jun. 26, 2007 by Raynold M. Kahn et al.
EPO Communication dated Oct. 2, 2012 in European Patent Application No. 02789164.7 filed Sep. 20, 2002 by Raynold M. Kahn et al.
Notice of Allowance dated Nov. 9, 2011 in U.S. Appl. No. 009/620,833, filed Jul. 21, 2000 by Raynold M. Kahn et al.
Final Rejection dated Mar. 15, 2011 in U.S. Appl. No. 09/620,833, filed Jul. 21, 2000 by Raynold M. Kahn et al.
Non-final Office action dated Jun. 20, 2013 in U.S. Appl. No. 13/402,584, filed Feb. 22, 2012 by Raynold M. Kahn et al.

* cited by examiner

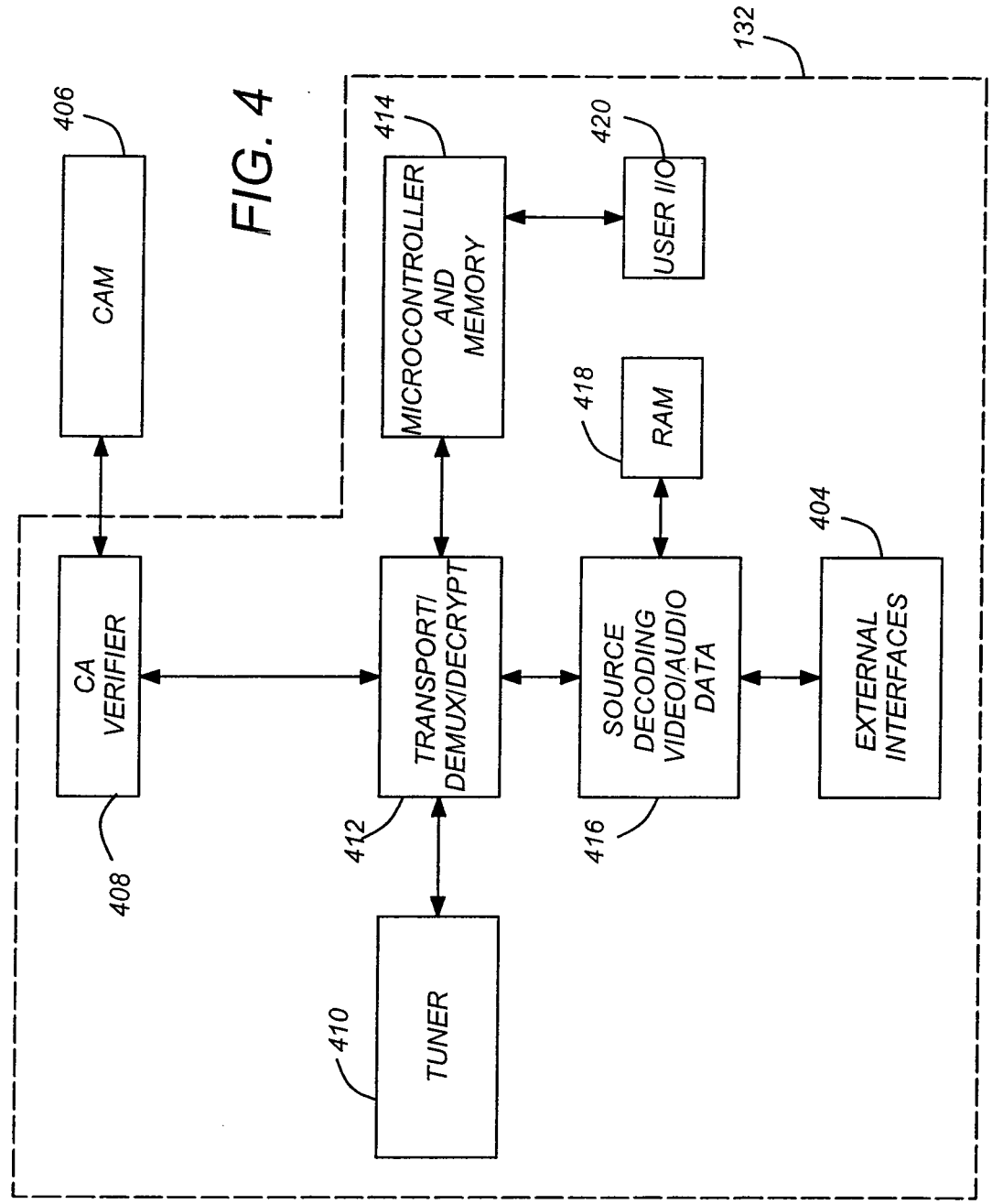

METHOD AND APPARATUS FOR ENCRYPTING MEDIA PROGRAMS FOR LATER PURCHASE AND VIEWING

This application is a divisional of U.S. patent application Ser. No. 09/960,824, entitled "METHOD AND APPARATUS FOR ENCRYPTING MEDIA PROGRAMS FOR LATER PURCHASE AND VIEWING," by Raynold M. Kahn, filed on Sep. 21, 2001, now issued as U.S. Pat. No. 7,409,562, which application is hereby incorporated by reference.

CROSS-REFERENCE TO RELATED APPLICATIONS

This application is related to the following patent applications, all of which applications are hereby incorporated by reference herein:

U.S. patent application Ser. No. 09/620,832, entitled "VIDEO ON DEMAND PAY PER VIEW SERVICES WITH UNMODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000, now issued as U.S. Pat. No. 6,853,728;

U.S. patent application Ser. No. 11/654,752, entitled "SECURE STORAGE AND REPLAY OF MEDIA PROGRAMS USING A HARD-PAIRED RECEIVER AND STORAGE DEVICE," filed Jan. 18, 2007, by Raynold M. Kahn et al., which is a continuation of U.S. patent application Ser. No. 09/620,833, entitled "SECURE STORAGE AND REPLAY OF MEDIA PROGRAMS USING A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 11/701,800 entitled "SUPER ENCRYPTED STORAGE AND RETRIEVAL OF MEDIA PROGRAMS IN A HARD-PAIRED RECEIVER AND STORAGE DEVICE," filed Feb. 2, 2007, by Raynold M. Kahn et al., which is a continuation of U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000 now issued as U.S. Pat. No. 7,203,311;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000, now issued as U.S. Pat. No. 7,203,314;

U.S. patent application Ser. No. 09/620,772, entitled "SUPER ENCRYPTED STORAGE AND RETRIEVAL OF MEDIA PROGRAMS WITH SMARTCARD GENERATED KEYS," by Raynold M. Kahn, Gregory J. Gagnon, David D. Ha, Peter M. Klauss, Christopher P. Curren, and Thomas H. James, filed on Jul. 21, 2000; and Application Ser. No. 10/759,679 entitled "VIRTUAL VIDEO ON DEMAND USING MULTIPLE ENCRYPTED VIDEO SEGMENTS", filed Jan. 19, 2004, by Robert G. Arsenault et al., which is a continuation of U.S. patent application Ser. No. 09/491,959, entitled "VIRTUAL VIDEO ON DEMAND USING MULTIPLE ENCRYPTED VIDEO SEGMENTS," by Robert G. Arsenault and Leon J. Stanger, filed on Jan. 26, 2000 now issued as U.S. Pat. No. 6,701,528.

This application is also related to the following applications:

Application Ser. No. 09/590,417, entitled "METHOD AND APPARATUS FOR TRANSMITTING, RECEIVING, AND UTILIZING AUDIO/VISUAL SIGNALS AND OTHER INFORMATION", filed Jun. 8, 2000, by Arthur Tilford;

Application Ser. No. 10/490,261 entitled "METHOD AND APPARATUS FOR CONTROLLING PAIRED OPERATION OF A CONDITIONAL ACCESS MODULE AND AN INTEGRATED RECEIVER AND DECODER", filed Aug. 5, 2004, by Raynold M. Kahn et al., which is a national stage entry of PCT/US02/29881 filed Sep. 20, 2002;

Application Ser. No. 10/758,811 entitled "DISTRIBUTION OF VIDEO CONTENT USING A TRUSTED NETWORK KEY FOR SHARING CONTENT", filed Jan. 16, 2004, by Raynold M. Kahn et al;

Application Ser. No. 10/758,818 entitled "DISTRIBUTION OF BROADCAST CONTENT FOR REMOTE DECRYPTION AND VIEWING", filed Jan. 16, 2004, by Raynold M. Kahn et al;

Application Ser. No. 10/758,865 entitled "DISTRIBUTION OF VIDEO CONTENT USING CLIENT TO HOST PAIRING OF INTEGRATED RECEIVERS/DECODERS", filed Jan. 16, 2004, by Raynold M. Kahn et al;

Application Ser. No. 10/790,466 entitled "VIDEO ON DEMAND IN A BROADCAST NETWORK", filed Mar. 1, 2004, by Stephen P. Dulac;

Application Ser. No. 11/433,926 entitled "METHODS AND APPARATUS TO PROTECT CONTENT IN HOME NETWORKS", filed May 15, 2006, by Raynold M. Kahn;

Application Ser. No. 11/433,969 entitled "METHODS AND APPARATUS TO PROVIDE CONTENT ON DEMAND IN CONTENT BROADCAST SYSTEMS", filed May 15, 2006, by Peter M. Klauss et al.;

Application Ser. No. 11/434,082 entitled "CONTENT DELIVERY SYSIEMS AND METHODS TO OPERATE THE SAME", filed May 15, 2006, by Raynold M. Kahn et al.;

Application Ser. No. 11/434,404 entitled "SECURE CONTENT TRANSFER SYSTEMS AND METHODS TO OPERATE THE SAME", filed May 15, 2006, by Raynold M. Kahn et al;

Application Ser. No. 11/434,437 entitled "METHODS AND APPARATUS TO CONDITIONALLY AUTHORIZE CONTENT DELIVERY AT RECEIVERS IN PAY DELIVERY SYSTEMS", filed May 15, 2006, by Raynold M. Kahn et al.;

Application Ser. No. 11/434,528 entitled "METHODS AND APPARATUS TO CONDITIONALLY AUTHORIZE CONTENT DELIVERY AT BROADCAST HEADENDS IN PAY DELIVERY SYSTEMS", filed May 15, 2006, by Raynold M. Kahn et al.;

Application Ser. No. 11/434,538 entitled "METHODS AND APPARATUS TO CONDITIONALLY AUTHORIZE CONTENT DELIVERY AT CONTENT SERVERS IN PAY DELIVERY SYSTEMS", filed May 15, 2006, by Raynold M. Kahn et at;

Application Ser. No. 11/499,635 entitled "DISTRIBUTED MEDIA-PROTECTION SYSTEMS AND METHODS TO OPERATE THE SAME", filed Aug. 4, 2006, by Michael Ficco;

Application Ser. No. 11/499,636 entitled "DISTRIBUTED MEDIA-AGGREGATION SYSTEMS AND METHODS TO OPERATE THE SAME", filed Aug. 4, 2006, by Michael Ficco; and Application Ser. No. 11/501,985 entitled "SECURE DELIVERY OF PROGRAM CONTENT VIA A REMOVAL STORAGE MEDIUM", filed Aug. 10, 2006, by Raynold M. Kahn et al.

BACKGROUND OF THE INVENTION

1. Field of the Invention

The present invention relates to systems and methods for providing video program material to subscribers, and in particular to a method and system for securely storing and replaying media programs.

2. Description of the Related Art

In recent years, there has been increasing interest in allowing cable and satellite television subscribers to record broadcast media programs for later viewing. This capability, hereinafter referred to as personal video recording (PVR), can be used to provide video-on-demand (VOD) services, or simply to allow the subscriber to save media programs for repeated viewing and/or archival purposes.

In the past, video cassette tape recorders (VCRs) have been used for such personal video recording. Recently, however, hard disks, similar to those used in personal computers, have been used to store media programs for later viewing. Unlike VCRs, such devices typically do not include a tuner, and are instead coupled to the satellite receiver or cable box. Also unlike VCRs, these devices are typically used to record digitized content, not analog video. This difference is both advantageous and disadvantageous.

An advantage of such devices is that they permit long term storage and multiple replays without substantial degradation. Another advantage is that they permit more rapid trick-play functions such as fast forwarding and rewinding. A disadvantage of such devices is that they are capable of making multiple-generation copies of the program material as well, and without serious degradation. This raises the very real possibility that the multiple generation copies of the media programs will be produced and distributed without permission. This possibility has caused some media providers to be reluctant to allow their media programs to be recorded by such devices.

To ameliorate this problem, it is critical to protect the stored media programs with strong security and copy control. Current devices do not scramble media programs before storage, nor do they store copy protection information. Instead, such devices record decrypted program content into the storage disk using a paired hardware scheme in which the hard disk controller and hard disk are paired to each other specifically through a specific interface. Because the hard disk controller and the disk itself are essentially paired together, storage or playback will not function if the disk were to be removed and transferred to another player. The weakness of this security scheme is that it relies only on the paired hardware to ensure security . . . the media programs stored on the disk drive itself are not encrypted.

While it would presumably be possible to simply store the datastream as it is received from the broadcaster for later replay, this technique has distinct disadvantages. One such disadvantage is that it would provide pirates a permanently recorded version of the encrypted datastream, thus providing the pirate with information that can be used to perform detailed analyses of the datastream itself to determine the encryption techniques and codes.

What is needed is a system and method for securely recording broadcast media programs (including impulse purchase pay-per-view programs) for limited use playback at a later time. Such a system could be used to support video-on-demand (VOD), thus allowing the subscriber to purchase media programs and games from the set top box instantly without worrying about the start time of the program.

SUMMARY OF THE INVENTION

In summary, the present invention describes a system and method for storing and retrieving program material for subsequent replay. The method comprises the steps of accepting a receiver ID associated with a receiver key stored in a memory of the receiver, determining a pairing key for encrypting communications between the conditional access module and the receiver, encrypting the pairing key with the receiver key, and transmitting a message comprising the encrypted pairing key to the receiver.

The apparatus comprises a receiver for receiving a data stream transmitting a media program encrypted according to a media encryption key and an encrypted media encryption key and a conditional access module, communicatively coupleable with the receiver. The receiver comprises a first decryptor, for decrypting a message from the conditional access module according to a pairing key, the message comprising the media encryption key, and the conditional access module comprises a second decryptor for decrypting the encrypted media encryption key and a first encryptor for encrypting messages with the receiver according to the pairing key.

One object of the present invention is to provide for the reception and decryption of broadcast media programs, including impulse pay-per-view (IPPV) programs, that can be played and recorded onto storage media and allows playback at a later time with limited use. The data itself may be placed in short term storage, but the replay of the media programs can be accomplished with trick play functions such as forward, reverse, fast forward, fast reverse, frame advance, and pause functions.

Another object of the present invention is to provide PVR functions which provide recording, delayed playback, and trick play of IPPV media programs from the storage media without requiring a pre-purchase of the IPPV media program. This would allow the IPPV media program to be purchased and viewed at the users leisure without requiring the IPPV media program to be purchased prior to storage. Ideally, such a system would allow the user to select the IPPV media program from the storage device, subject to limited play rights.

Still another object of the present invention is to provide a pairing between the storage media and elements of the subscriber's IRD to assure that playback of the media programs from the storage device are permitted only with the proper IRD.

Still another object of the present invention is to provide a secure means for storing broadcast data streams (including IPPV and games) on a data storage device, while providing for adequate copy protection.

Still another object of the present invention is to provide a system and method for handling the archiving and retrieving of media programs and other data, even if the data storage device fails.

Still another object of the present invention is to provide a system and method that allows media program purchases to be recorded in a way that is analogous to that which is employed for real-time off-the-air programs.

Still another object of the present invention is to provide a system that provides a growth path to a system permitting IPPV media programs to be previewed without charge for an initial period of time with the option: to purchase the media program or cancel the purchase, regardless of whether the program is retrieved from the storage device or obtained from a real time broadcast.

Still another object of the present invention is to achieve all of the foregoing without requiring substantial changes to conditional access module hardware and/or software.

The present invention eliminates concerns regarding the proliferation of unauthorized digital copies of the media programs by use of a strong encryption method. Further, the present invention ensures that the stored material cannot be distributed since such decryption of the material can only be successfully performed by the encrypting IRD.

BRIEF DESCRIPTION OF THE DRAWINGS

Referring now to the drawings in which like reference numbers represent corresponding parts throughout:

FIG. 4 is a block diagram illustrating a high-level block diagram of the IRD.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Media Program Distribution System

Figure 1:
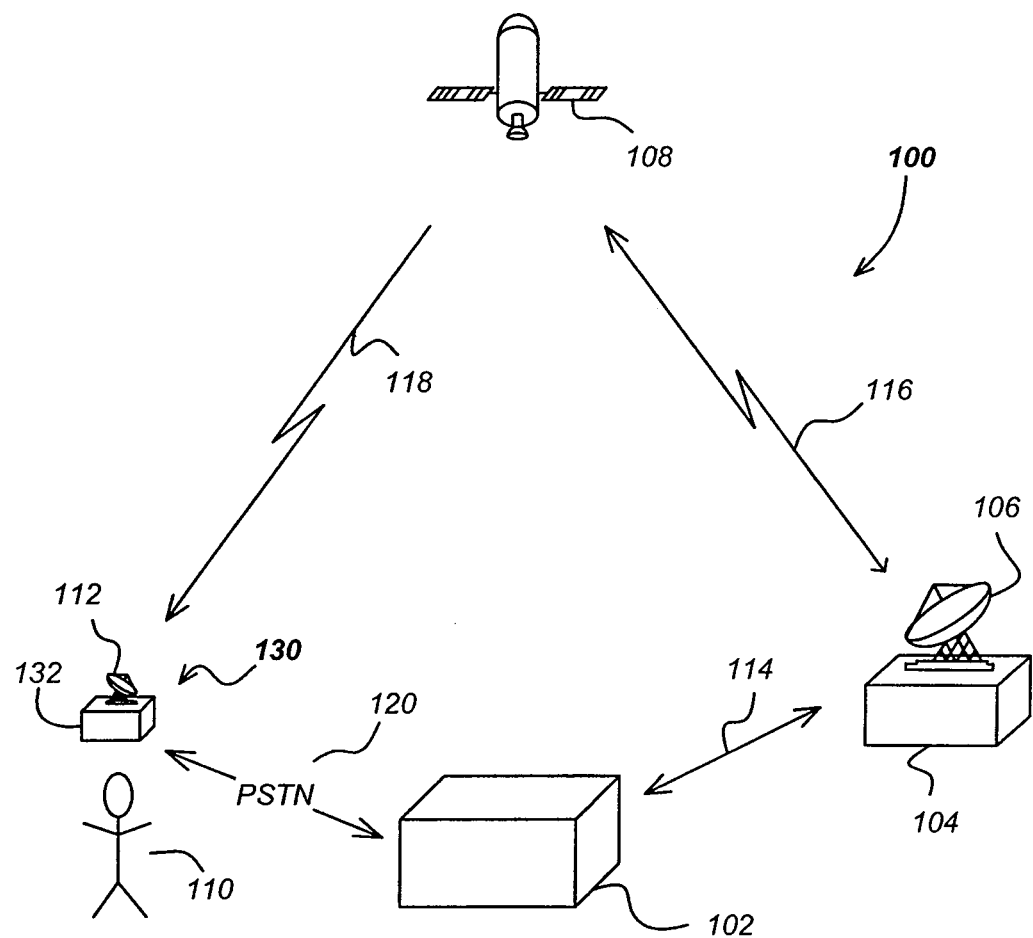
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground or other link 114 and an integrated receiver/decoder (IRD) 132 at receiver station 130 via a public switched telephone network (PSTN) or other communication link 120. The control center 102 provides program material to the uplink center 104, coordinates with the receiver station 130 to offer subscribers 110 media programs including pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the IRD 132 at the receiver station 130 via downlink 118. The IRD 132 receives this information using the subscriber antenna 112, to which it is communicatively coupled.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information, or any other kind of data as well.

Figure 2:
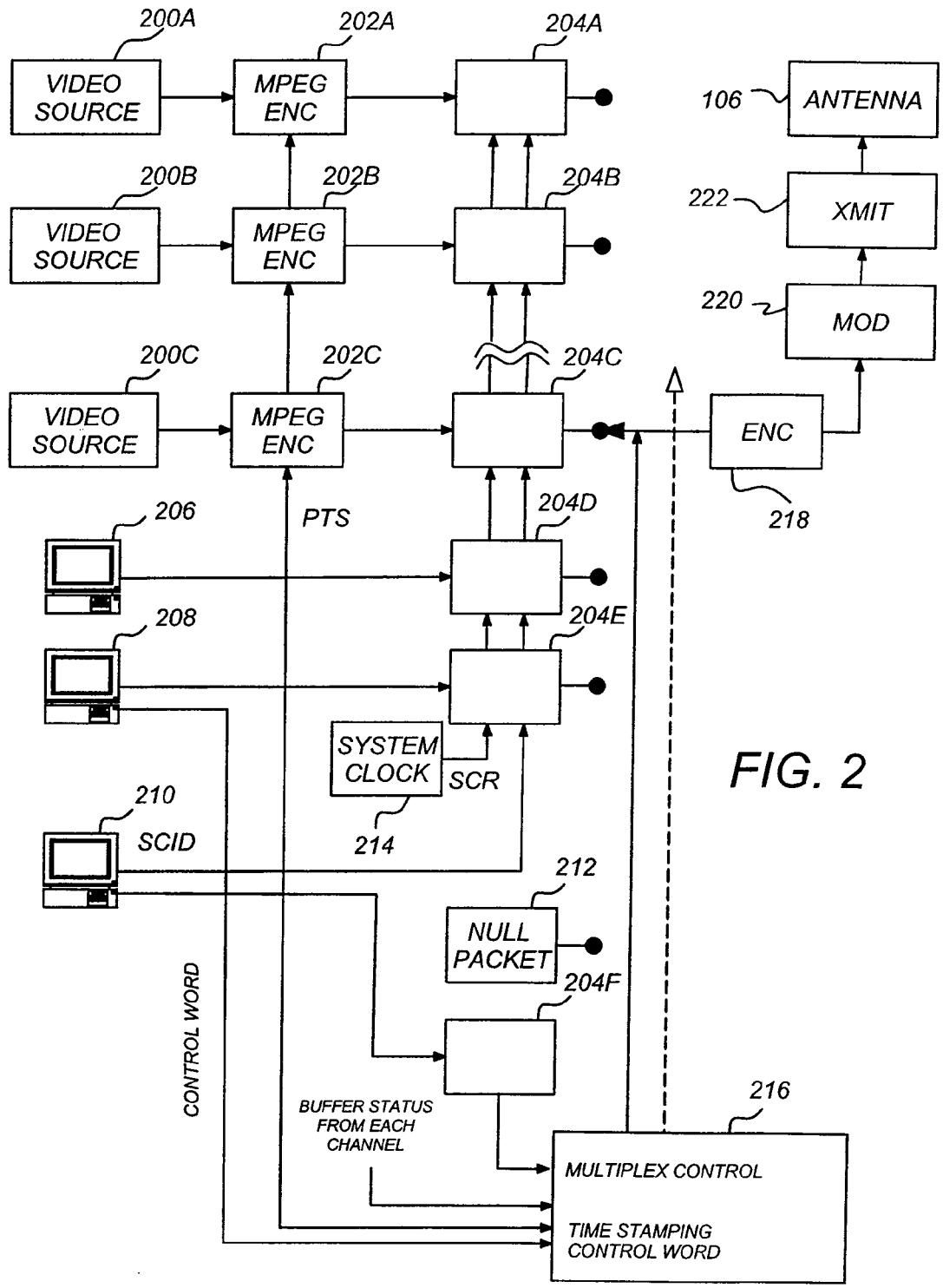
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200, 206-210.

The data packets are assembled using a reference from the system clock 214 (SCR), a control word (CW) generated by the conditional access manager 208, and a system channel identifier (SCID) generator 210 that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) which comprises control data including the control word (CW) and other control data used in support of providing conditional access to the program material is also encrypted and transmitted.

Figure 3A:
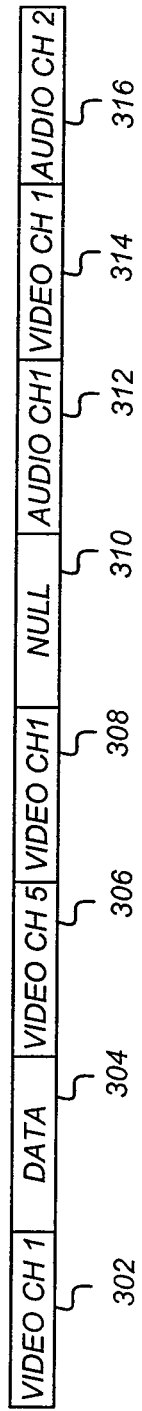
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 312 may be inserted into the data stream as desired.

Figure 3B:
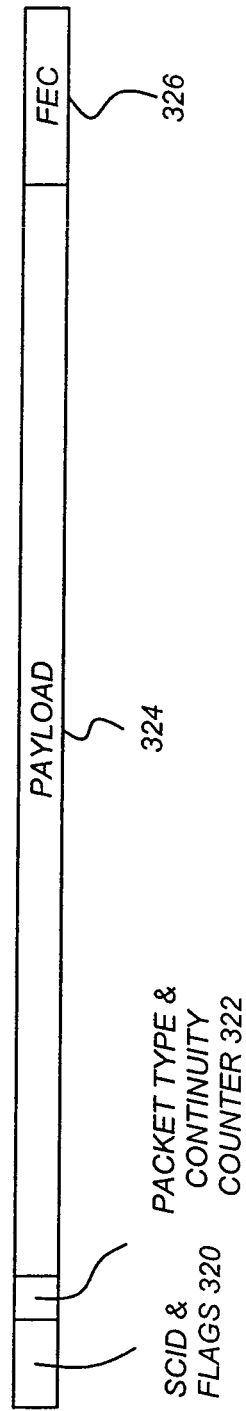
FIG. 3B is a diagram illustrating the structure of a data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an alphanumeric encryption key referred to hereinafter as a control word (CW). This can be accomplished by a variety of data encryption techniques, including symmetric algorithms such as the data encryption standard (DES) and asymmetric algorithms such as the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the CWP, including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the encrypted CWP to retrieve the CW. Then, using the CW, the IRD 132 can decrypt the media program so that it can be presented to the subscriber 110.

To further discourage piracy, the control data needed to decrypt and assemble data packets into viewable media programs may be time-varying (the validity of the control data in a CWP to decode a particular media program changes with time). This can be implemented in a variety of ways.

For example, since each CWP is associated with a SCID for each media program, the SCID related to each CWP could change over time.

Another way to implement time-varying control data is to associate time stamps with the received data stream and the CWP control data. In this case, successful decoding of the CWP to produce the CW would require the proper relationship between the time stamps for the data stream and the control data in the CWP. This relationship can be defined, for example, by changing the decryption scheme used to generate the CW from the CWP according to the received time stamp for the data stream. In this case, if the time stamp of the received data stream does not match the expected value, the wrong decryption scheme will be selected and the proper CW (to decrypt the program material) will not be produced. If, however, the time stamp of the received data stream matches the expected value, the proper decryption scheme will be selected, and the CWP decryption scheme will yield the proper CW.

Pay-Per-View Services

The data required to receive and view pay-per-view (PPV) media programs are stored in the CWP and in another data packet known as the purchase information parcel (PIP). Both the CWP and the PIP are broadcast to the subscriber via the video distribution system 100 in real time. As described below, the CWP is used by the IRD 132 to retrieve PPV media programs.

Generally, PPV services can include operator-assisted pay-per-view (OPPV) and impulse pay-per-view (IPPV) services. When requesting OPPV services, the subscriber 110 must decide in advance that they desire access to a particular media program. The subscriber 110 then calls an entity such as the control center 102, and requests access to the media program. When requesting impulse pay-per-view services (IPPV), the subscriber 110, while viewing the program guide, moves the cursor over the viewer channel associated with the desired media program, and selects "enter." After the decision and rights to purchase a PPV program are confirmed (for example, by checking channel lockouts, rating limits, and purchase limits), a purchase information parcel (PIP) is received and stored in the subscriber's conditional access module 406 (which is described in more detail below) for further use. The conditional access module 406 associates the information in the CWP and the PIP, and uses the PIP in conjunction with the CWP to verify that the subscriber 110 should be provided access to the media program and to decrypt the media program.

Reception and Decryption of Live Media Programs without Conditional Access Module and IRD Pairing FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 which performs at least some of the functions necessary to verify that the subscriber 110 is entitled to access the media programs.

The IRD 132 comprises a tuner 410, a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

The tuner 410 receives the data packets from the video distribution system and provides the packets to the TDM 412. Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, a computer, or a media storage device such as a hard drive. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the I/O indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 406 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959.

Pairing the Conditional Access Module and the IRD

To discourage piracy, the present invention operatively pairs the conditional access module (CAM) 406 and the IRD 132 so that each IRD 132 will only operate with the designated CAM 406 and each CAM 406 will only operate with the designated IRD 132. This is accomplished by encrypting communications between the CAM 406 and the IRD 132 according to a pairing key that is generated from a secret receiver key in the IRD 132.

Figure 5:
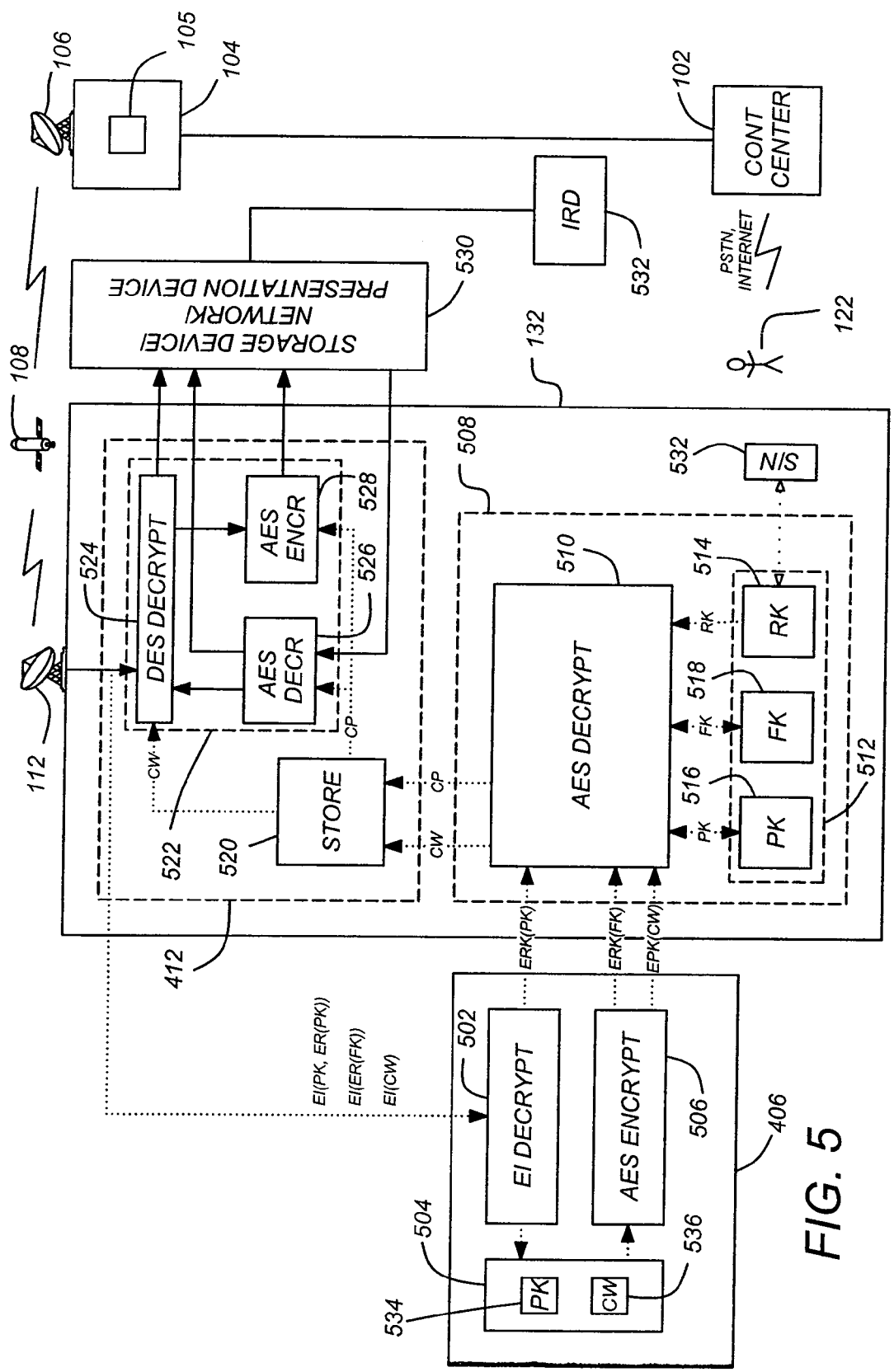
FIG. 5 is a diagram showing the functional relationship between the conditional access module, the IRD, and the security and transport chips therein.

FIG. 5 is a functional block diagram of a paired CAM 406 and IRD 132. The CAM 406 includes a decryptor 502 (hereinafter also referred to as EI decryptor) that implements the I/O indecipherable algorithm discussed above, an encryptor 506 (hereinafter also referred to as AES encryptor) and a memory 504. In one embodiment, the encryptor 506 is an advanced encryption standard (AES) encryptor, but other encryption schemes and algorithms can also be used.

The IRD 132 includes the transport module 412 and a security module 508. The transport module 412 and the security module 508 can be implemented on an integrated circuit (IC) separate from other circuits in the IRD 132, and sealed to prevent tampering. The transport module 412 and the security module 508 can be implemented in separate ICs or in the same IC.

The security module 508 includes a decryptor 510, which decrypts communications transmitted from the conditional access module 406, and provides the results of these decrypted communications to the transport module 412. The decryptor 510 can also encrypt or otherwise combine content information and copy control information with the family key 518 to produce a copy protection key (CP) as described below. The decryptor 510 can be implemented in separate modules for encrypting and decrypting, if desired.

The security module 508 includes a memory 512 for storing keys and other information. In one embodiment, the memory 512 is tamper-proof in that the contents of the memory 512 cannot be read and presented externally to the security module 508 (e.g. the contents are user-unreadable). This feature prevents compromise of the keys stored in the memory 512. The memory 12 may also be volatile memory.

In one embodiment, the security module 508 places the control words (CW) into a CW cache of the transport module 412 via direct memory access (DMA). It is therefore impossible to output or input the CWs via a system bus. Since the encrypted control word EPK (CW) from that CAM 406 can only be decrypted by the receiver 132 that contains the appropriate receiver key 514, this cryptographically binds ("pairs") the CW output of the CAM 406 to the security module 508.

Keys that may be stored in the memory 512 include, for example, a pairing key 516, a family key 518, and a receiver key 514. In one embodiment of the invention, the receiver key 514 is provided pre-installed in the security module 508 (and hence, with the IRD 132) when the IRD 132 is provided to the subscribing user. Preferably, the receiver key 514 is user-unreadable, is unique to the IRD 132, and is uniquely associated with the serial number 532.

The decryptor 510 transmits decrypted control words and copy protection (CP) session keys to the transport module 412 where the keys may be temporarily stored for later use. The decrypted control words (CW) are provided to a first transport chip decryptor 524 to allow the media program stream to be decrypted. The resulting decrypted media program stream can be provided to a presentation device (such as a television, monitor, computer, or audio system), a storage device (such as a read/writable CDROM or DVD or a hard drive), or a network for viewing or storage elsewhere.

In one embodiment, the IRD 132 is communicatively coupled to a second IRD 532 (hereinafter alternatively referred to as a "daughter IRD"). The daughter IRD can be used to request media programs that are received or reproduced by the IRD 132, thus allowing media programs to be reproduced at other locations in the home. Preferably, the daughter IRDs 532 do not include long-term storage capacity (e.g. no hard disk), so the daughter IRDs request the storage and retrieval of media programs from the IRD 132. Daughter IRDs 532 can be communicatively coupled to the primary or master IRD 132 via any communication link, including a direct coaxial connection, or via a local area network (LAN) or other digital communication medium.

Returning to the transport module 412 of FIG. 5, the CP key is used by the decryptor 526 and encryptor 528 to encrypt and decrypt data that is stored and retrieved from the storage device or network 530.

One feature of the present invention is that it allows for paring of the conditional access module 406 and the IRD 132, thus preventing any conditional access module 406 to be used with any IRD 132.

The control center 102 can elect to change the pairing key (PK) as desired. This can be scheduled to occur randomly as a security precaution or to revoke a user's rights to use the IRD 132.

Operatively Pairing the Conditional Access Module and the IRD

Figure 6A:
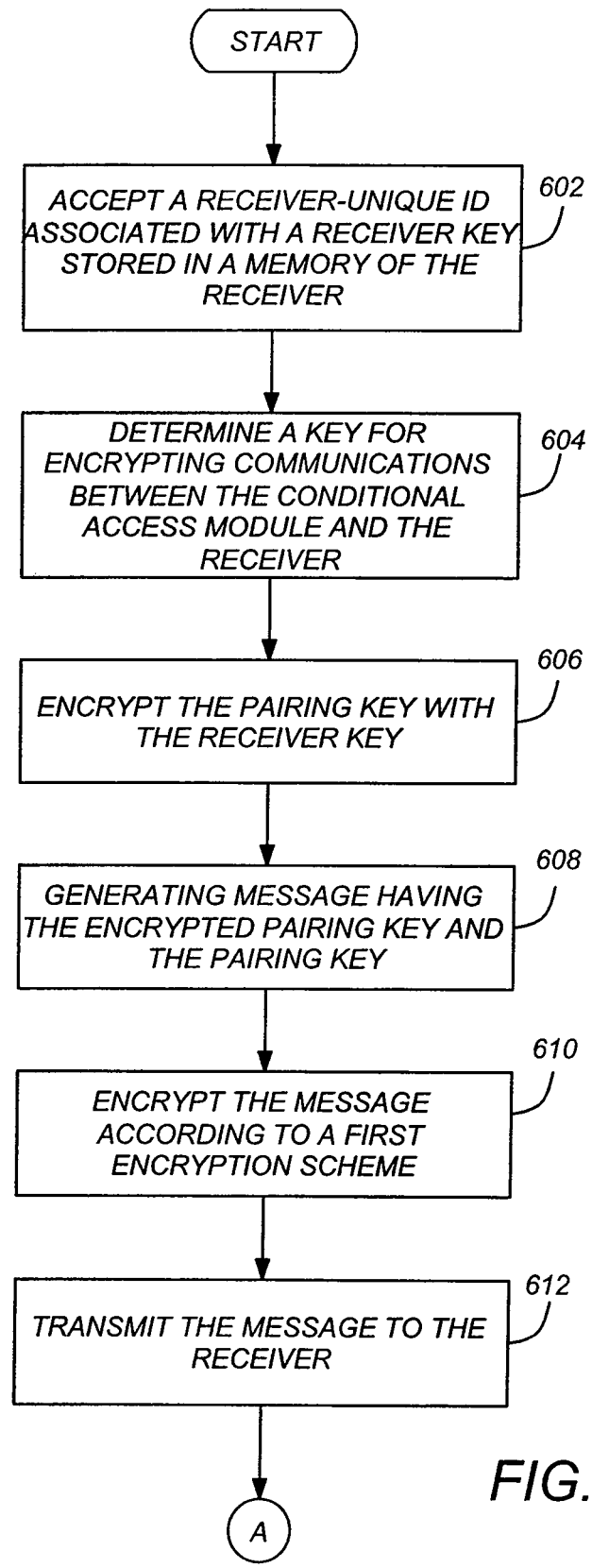
FIGS. 6 and 7 are a diagrams showing the storage of the pairing key in the IRD.
Figure 6B:
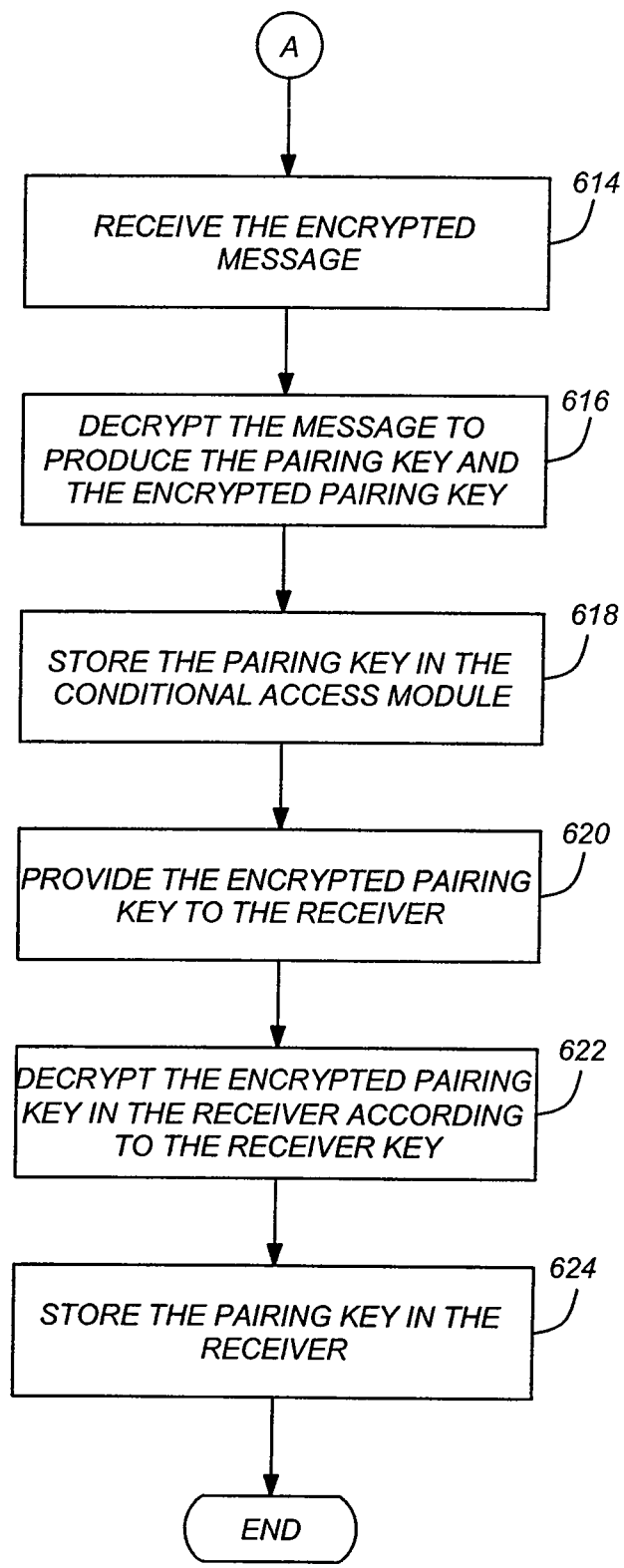

FIGS. 6A and 6B are diagrams depicting how the conditional access module 406 can be paired with the IRD 132. After the subscribing user 122 has purchased and installed the IRD 132 and associated hardware, the user 122 supplies a IRD 132 unique identifier (such as the serial number 532) to the control center 102. This can be accomplished via the public switched telephone network (PSTN), the Internet, mail, or any other communication media. The IRD-unique identifier 132 is associated with the receiver key 514. This association is implemented in the IRD 132 itself, and is known to the control center 102. The control center 102 accepts the IRD-unique identifier 132, as shown in block 602, and determines a pairing key (PK) that will be used to encrypt communications between the conditional access module 406 and the IRD 132, as shown in block 604. The pairing key PK is then encrypted with the receiver key 514 (to produce ER(PK)), as shown in block 606. A message comprising the pairing key (PK) and the pairing key encrypted by the receiver key 514 (ER(PK)) is generated, as shown in block 608. The message is then encrypted, to produce EI(PK, ER(PK)) as shown in block 610. In the illustrated embodiment, the message is encrypted (and decrypted in the conditional access module 406) according to the I/O indecipherable algorithm described above, however, other encryption schemes can be used as well. The encrypted message is then transmitted to the IRD 132 (via satellite 108, terrestrial transmitter, telephone line, Internet, or other medium) where it is received, as shown in block 614. The transport module 412 routes data packets with the encrypted message EI(PK, ER(PK)) to the conditional access module 406 for decryption.

Using the decryptor 502 (e.g. by application of the I/O indecipherable algorithm) in the conditional access module 406, the message is decrypted, as shown in block 616. The pairing key 516 is stored in a memory location 534 in the conditional access module memory 504, as shown in block 618. The encrypted pairing key ER(PK) is also provided from the conditional access module 406 to the security module 508, as shown in block 620. Since the message is encrypted according to the receiver key 514, it is not exposed.

The encrypted paring key (ER(PK)) is decrypted in the security module 508 decryptor 510, using the receiver key 514. This is shown in block 622. The recovered pairing key is then stored in the IRD 132 in a secure memory 512. This paring key 516, now stored in both the IRD 132 and the conditional access module 406, is used to encrypt communications between the conditional access module 406 and the receiver 132. All or a subset of such communications can be encrypted, as desired. In one embodiment, all communications that are required to enable the user to view media programs are encrypted.

In the foregoing discussion, the message with the pairing key (PK) and the encrypted paring key ER(PK) was encrypted before transmission to the IRD 132. However, if the additional security is not required, the message need not be encrypted to practice the present invention. Furthermore, the present invention can be beneficially implemented even if the receiver key is not completely unique. For example, the receiver key could be one of 10,000 possible receiver keys. In this case, the possibility of the receiver key matching a particular pairing key (as described below) would be 1:10,000, which may be sufficient to prevent unauthorized use. In this context, substantial uniqueness, instead of absolute uniqueness may be all that is required for sufficient security.

Figure 7:
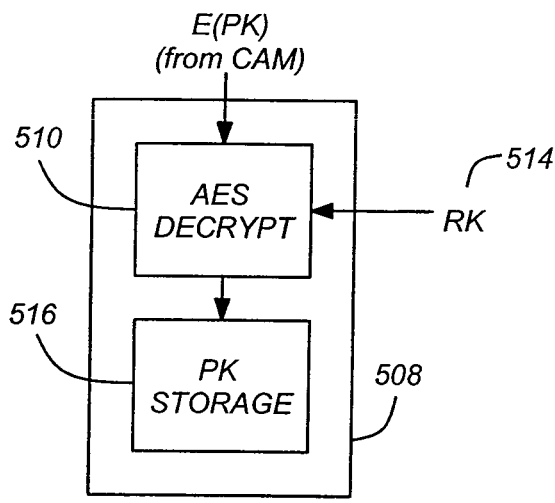

FIG. 7 is a diagram further illustrating the storage of the pairing key 516 in the IRD 132.

Operatively Pairing the Storage Device and the IRD

The present invention also provides for operational pairing between a storage device 530 and the IRD 132 and one or more daughter IRDs 532. It also assures that media programs are virtually never stored in the storage device plaintext. The pairing of the storage device 530 and the IRD 132 is accomplished by the use of a family key (FK).

Figure 8:
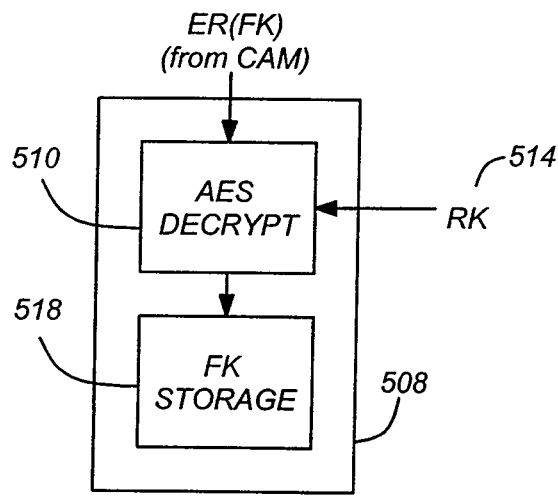
FIG. 8 is a diagram illustrating the storage of a family key in the IRD.

FIG. 8 is a diagram illustrating the storage of a family key (FK) 518 in the IRD 132. Unlike the pairing key (PK) 516, which is used to pair the IRD 132 and the conditional access module 406 together, the family key 518 is used to derive copy protection (CP) keys that are used to encrypt and decrypt information that is written to and read from the storage device 530 and/or network, essentially pairing the storage device with the IRD 132. The family key (FK) 518 can be used to generate copy protection keys (CP) used to encrypt content and can be used with multiple boxes. For example, in a network of boxes including a "parent" IRD 132 and a plurality of daughter IRDs 532, any of the daughter IRDs 532 can retrieve the encrypted program information and decrypt the information, so long as the family key (FK) 518 is available to the daughter IRD 532. Unlike the pairing key (PK) 516, the family key (FK) 518 is not typically stored in the CAM 406, but is stored in the secure memory 512 in the security module 508 in the IRD 132. A version of the family key (FK) 518 that has been encrypted according to the receiver key 514 (and may also be encrypted according to the I/O indecipherable algorithm) is transmitted to the IRD 132 by the satellite 108, passed through the transport module 412, routed to the CAM 406 (where it is decrypted if it was encrypted according to the I/O indecipherable algorithm) and then to the security module 508. Using the receiver key (RK) 514, the security module 508 decrypts the family key (FK) 518 and stores it in secure memory. The family key (FK) 518 may also be encrypted with the pairing key (PK) 516 before being transmitted to the IRD 132, if desired.

Figure 9:
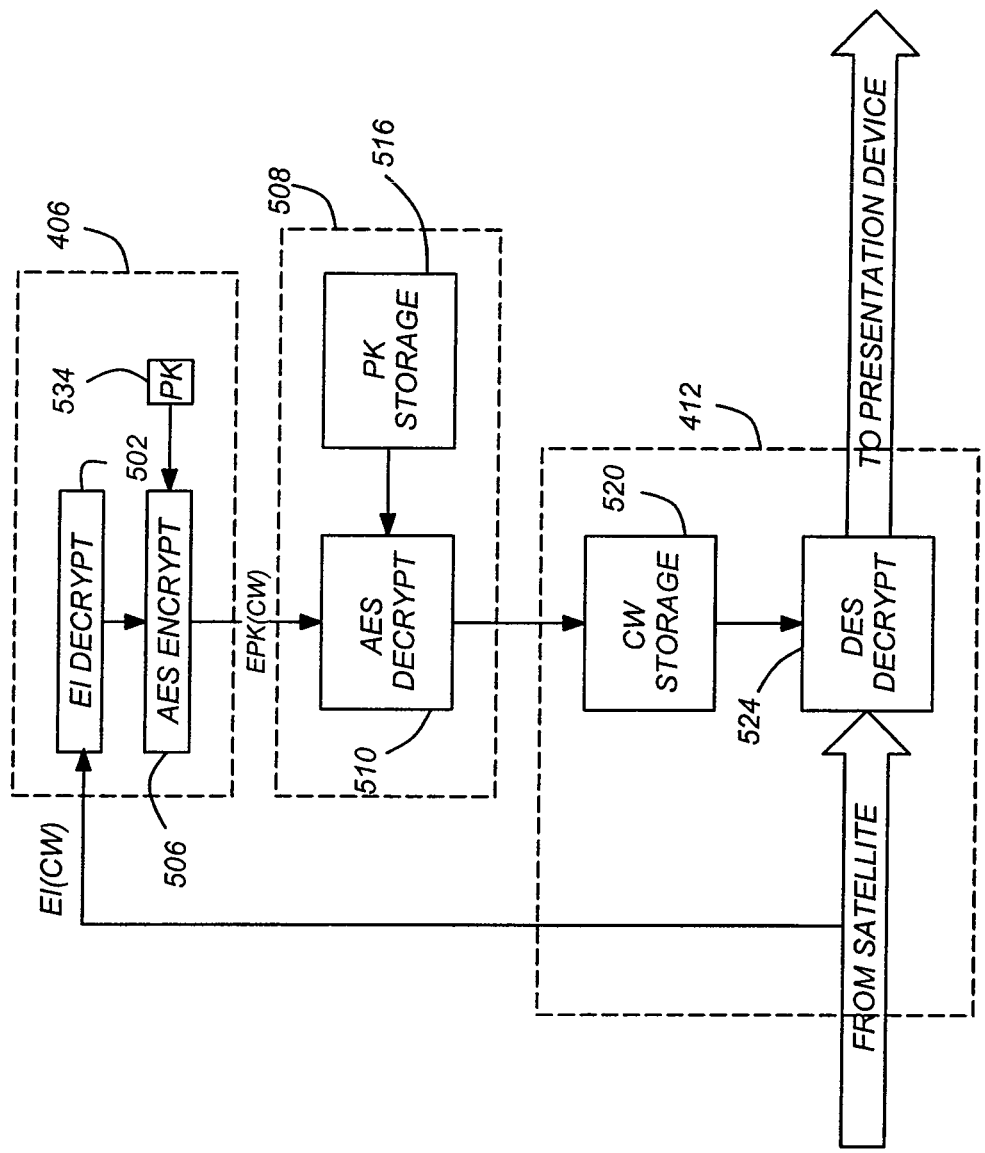
FIG. 9 is a diagram showing illustrative operations that can be performed when receiving a data stream having a media program in the IRD and presenting that media program.

FIG. 9 is a diagram showing the operations performed when receiving a data stream having a media program in the IRD 132, and presenting that media program in a presentation device 530. As described above, the media program is encrypted according to one or more media encryption keys (e.g. control words) so that control words (CW) are required to decrypt and present the media program for viewing. The IRD 132 receives encrypted media program and the control words encrypted according to the I/O indecipherable algorithm (EI(CW)). The transport module 412 routes those encrypted control words EI(CW) to the conditional access module 406, where they are decrypted by the decryptor 502, thus producing control words (CW) 536. The control words are then encrypted according to the pairing key (PK) 516 stored in the memory 534 of the conditional access module 406, and these encrypted control words EPK(CW) are transmitted to the security module 508 in the IRD 132. Using the pairing key (PK) 516 that was stored earlier, the decryptor 510 in the security module 508 decrypts the control words (CW) and provides them to the transport module 412 to be stored in the transport module memory 520 (e.g. cache). The control words (CW) are then matched to the associated data packets containing the media program, and provided to the decryptor 524. The decryptor 524 decrypts the media program, and the media program is provided to a presentation device 530 such as a television. Note that in this embodiment, the conditional access module 406 and the IRD 132 are paired together in the sense that the control words (CW) required to decrypt the media program are provided from the CAM 406 to the IRD 132 in form encrypted according to a unique key (the pairing key 516) that the CAM 406 and the IRD 132 share.

Figure 10:
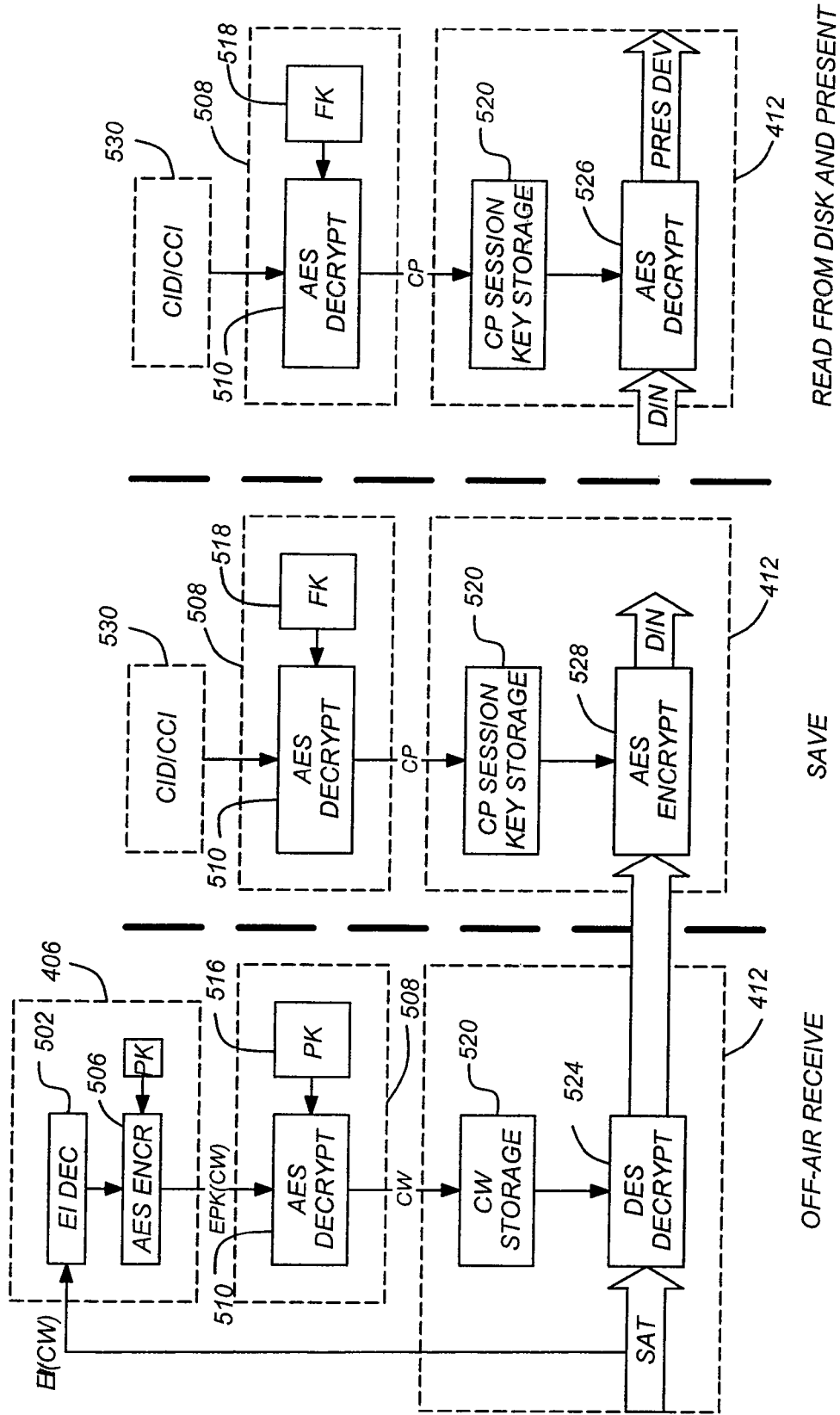
FIG. 10 is a diagram illustrating one embodiment of the operations performed in decrypting and re-encrypting the encrypted media program with a pairing key to operatively pair the conditional access module and the IRD.

FIG. 10 is a diagram showing the operations performed when a transmitted media program is saved in a storage device for later replay. First, the IRD 132 receives a data stream including the media program encrypted according to a media encryption key (CW). The encrypted media program is decrypted by the decryptor 524. A copy protection key is generated and stored in the transport module memory 520. Using the copy protection key, the encryptor 528 encrypts the data stream that was decrypted by the decryptor 524. The encrypted data stream is then stored in a storage device 530 locally accessible to the IRD 132. In one embodiment, the storage device is a hard drive internal to the IRD 132. The storage device may also be a hard drive resident in another device communicatively coupled to the IRD 132.

FIG. 10 illustrates one embodiment of how the encrypted media program may be decrypted and re-encrypted with a pairing key 516 to operatively pair the conditional access module 406 and the IRD 132. The encrypted media encryption keys EI(CW) are provided, via the transport module 412, to the conditional access module 406, where they are decrypted by the I/O indecipherable algorithm 502. The result is the media encryption key (CW). The media encryption key (CW) is re-encrypted according to the pairing key (PK) 516 to produce a re-encrypted media encryption key EPK(CW). The re-encrypted media encryption key EPK(CW) is provided to the security module 508, where it is decrypted using decryptor 510 and pairing key 516 to provide the media key (CW). The media encryption key (CW) is provided to the transport module 412, where it is cached in storage 520 and used to decrypt the media program.

FIG. 10 also illustrates one embodiment of how the copy protection key is generated. As shown in FIG. 10, the CP key is generated by combining (typically unencrypted) content identification information (CID) with the family key 518 that is stored in the security module 508. The CP key thus intrinsically includes information regarding identification of the recorded media program and copy control information. The CID information is passed to the decryptor 510 with the family key 518 to produce the CP key.

The CP key is then stored in the memory 520 of the transport chip, where it is used to encrypt the media program material that was decrypted by the decryptor 524.

The content identification information (CID) is unique to each media program. In one embodiment, the CID is a simple serial number. This embodiment minimizes the memory requirements to store and retain the CID. In another embodiment, the CID includes information such as the title and one or more of the artists of the media program. The CID may also include the running time of the media program, copyright information, actors, director, or rating information. This information can be entered by the user, or can be obtained from a program guide. Since it is very unlikely that any media program will have the same title as well as the other information, the CID be formed of such information while retaining it's uniqueness.

In one embodiment, the CID does not include sensitive information, and hence, can be stored anywhere in the system. In one embodiment, the CID is stored on the storage device along with the media program. For example, if the storage device is a hard disk drive, the CID could be included in the same file as the media program, stored in the same folder as the media program, or merely associated with the media program via a lookup table. When the a particular stored media program is played back, the CID is read from the hard disk and used to recreate the CP key.

In another embodiment, the CID information includes copy control information (CCI), which can be used to control the circumstances in which the associated media program can be copied or played back. For example, the CCI may indicate that the media program is to be played back only once, rather than played pack an indefinite number of times. The CCI may also indicate when the media program can be played back. This feature is useful in that it allows a media program to be recorded and not played back until such playback rights have been approved by the copyright holder or licensee.

In embodiments wherein the CID information includes CCI as well, it may be beneficial to encrypt the CID information with a convenient key before storing the information in the storage device, or otherwise exposing it to compromise. The CID information can be encrypted, for example, with the family key 518 before being stored on the hard drive.

After encryption by the CP key, the media program material is no longer unprotected (it is encrypted by the family key 518), and it is stored in a storage device 530, or provided across the network to a daughter IRD. Since the daughter IRD has access to the family key, the daughter IRD can decrypt the media program and present it to the user, if desired.

After at least a portion of the encrypted media program is stored to the storage device 530, it can be read from the storage device 530 and presented to the user for viewing. This can be initiated, for example, by providing a user command requesting the playback of the media program. This user command may include an identifier indicating which media program stored on the storage device 530 is of interest. Using this information, the CID/CCI information is obtained from storage (for example, the storage device 530 storing the media program), decrypted (if it was encrypted before being stored), and provided to the decryptor 510 for processing using the family key 518. The result is a CP key analogous to that which was used to encrypt the media program before storing it on the storage device 530. The CP key is then provided from the security module 510 to the transport module 412, where it is stored and used by the decryptor 526 to decrypt the media program being read from the storage device 530. The decrypted media program is then provided to a presentation device 530.

Storing Unpurchased Pay Per View Media Programs

Figure 11:
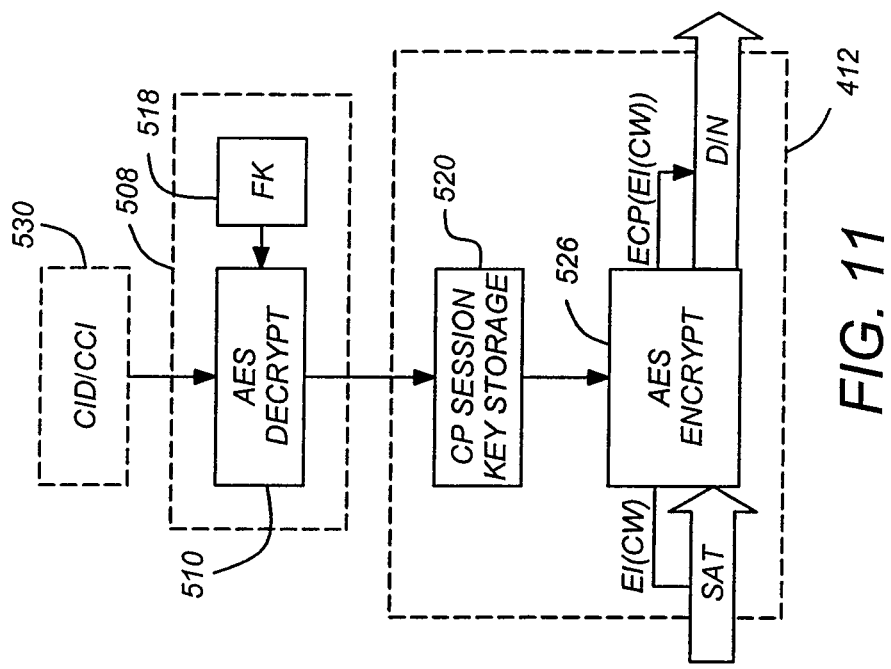
FIG. 11 is a diagram presenting illustrative operations that can be performed to store an unpurchased pay-per-view media program for later purchase and viewing.

FIG. 11 is a diagram presenting illustrative operations that can be performed to store an unpurchased pay-per-view media program for later purchase and viewing. A data stream including the media program, which is encrypted according to the media encryption key (CW), is received. A copy protection key (CP) is generated, and used to further encrypt the data stream, including the encrypted media and the encrypted media encryption key EI(CW). The data stream (with the media program) is now essentially double-encrypted by the media encryption key (CW) and by the copy protection key (CP) and can then be stored for purchase and view at the user's convenience. As illustrated in FIG. 11, the CP key is generated from the CID and the family key (FK) 518 as described earlier.

Retrieving and Playing Pay Per View Media Programs

Figure 12:
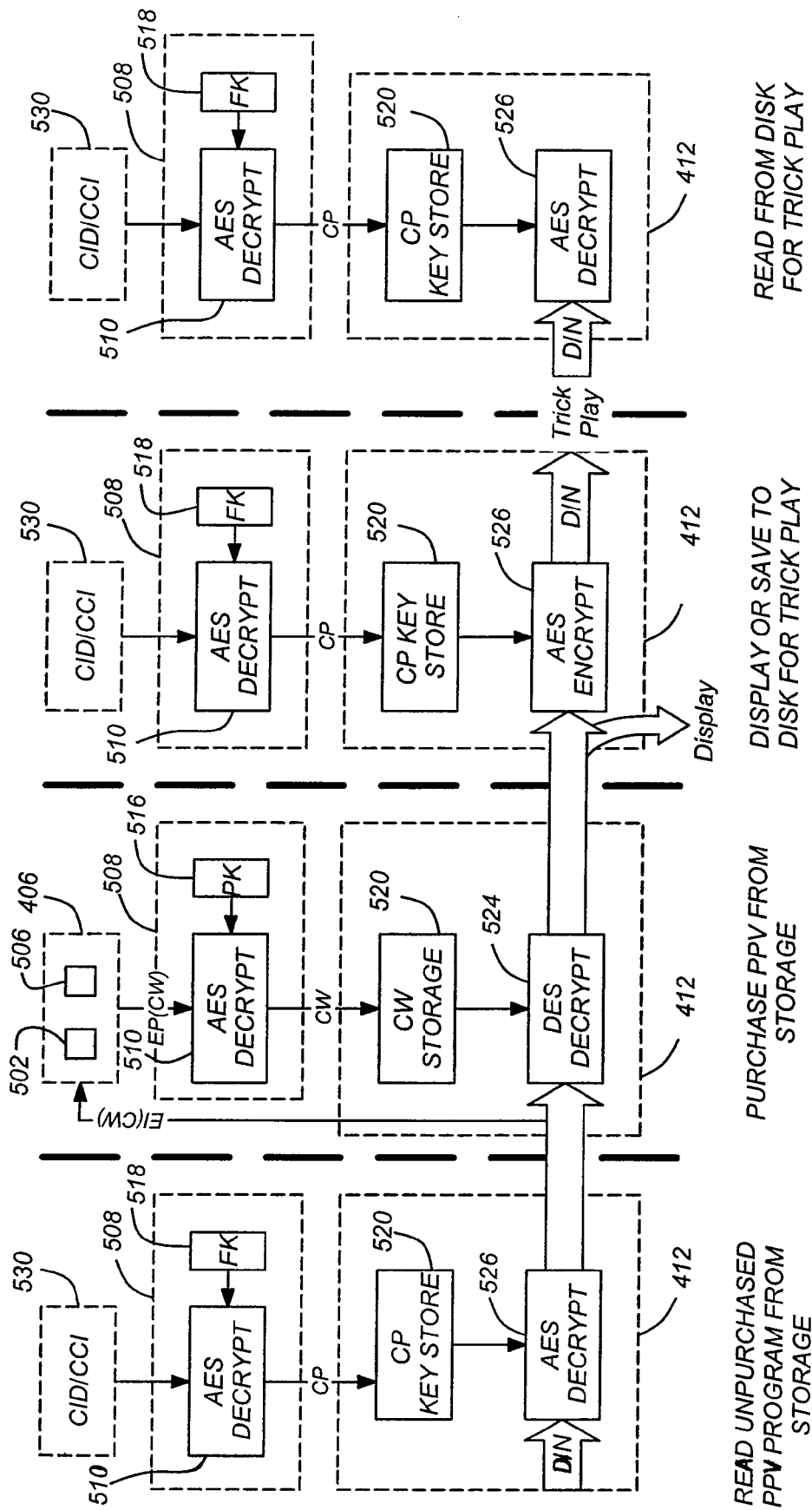
FIG. 12 is a diagram presenting illustrative operations that can be performed to play back a stored and unpurchased pay-per-view media program.

FIG. 12 is a diagram presenting illustrative operations that can be performed to play back a stored and unpurchased PPV media program. After the user commands the system to playback the stored PPV media program, a copy protection (CP) key is generated from the content identifier (CID) and the family key (FK) 518. The copy protection (CP) key is stored in the cache 520 in the transport module 412, and is used to decrypt the double-encrypted data stream read from the storage device 530. The resulting output is the media program (which is still encrypted by the media encryption key (CW), and the still-encrypted media program encryption key EI(CW)).

Essentially, this output is identical to that of a real-time off the air broadcast. While the media encryption key (CW) is time invariant (varies with time, and therefore each media encryption key is usable only with certain data packets of the media program), the media encryption keys and media program are both "stale" by the same amount, and therefore, the media encryption key (CW) can be used to decrypt the encrypted media program just as would have been the case if the media program was decrypted and played back in real time off the air. For this reason, PPV billing can be implemented in the CAM 406 without substantial changes. Before decrypting the encrypted media keys EI(CW), the CAM 406 records information required to bill the user for viewing the recorded program, and transmits that billing information to the control center 102 as required.

The encrypted media encryption key EI(CW) is then provided to the CAM 406, where it is decrypted with the I/O indecipherable algorithm and re-encrypted with the pairing key (PK) 516 to produce an re-encrypted media encryption key EPK(CW). The re-encrypted media encryption key is provided to the security module 508, which decrypts the re-encrypted media encryption key EPK(CW) to produce the media encryption key (CW). The media encryption key (CW) is provided to the transport module 412, where it is cached and used to decrypt the encrypted media program. The media program is now plaintext, and can be provided to the media presentation device 530.

Special provision is made for so-called "trick play" features, in which the user wishes to fast forward, rewind, scan forward, scan in reverse, or pause the presentation of the media program. To assure that the media program is not compromised, the present invention does not store any significant portions of the media program plaintext, even when such trick play features are invoked. Instead, the media program is re-encrypted according to the copy protection (CP) key and retrieved and decrypted according to the copy protection key (CP) as well, as shown in FIG. 12. The copy protection key is generated from the family key 518 and the CID.

The present invention can also be used to store and retrieve a wide variety of digital media, including music, computer programs, computer data, photographs, as well as video. For example, the present invention can be used to purchase an entire album, or just one song from a particular album.

Digital Media Purchase and Playback

Figure 13:
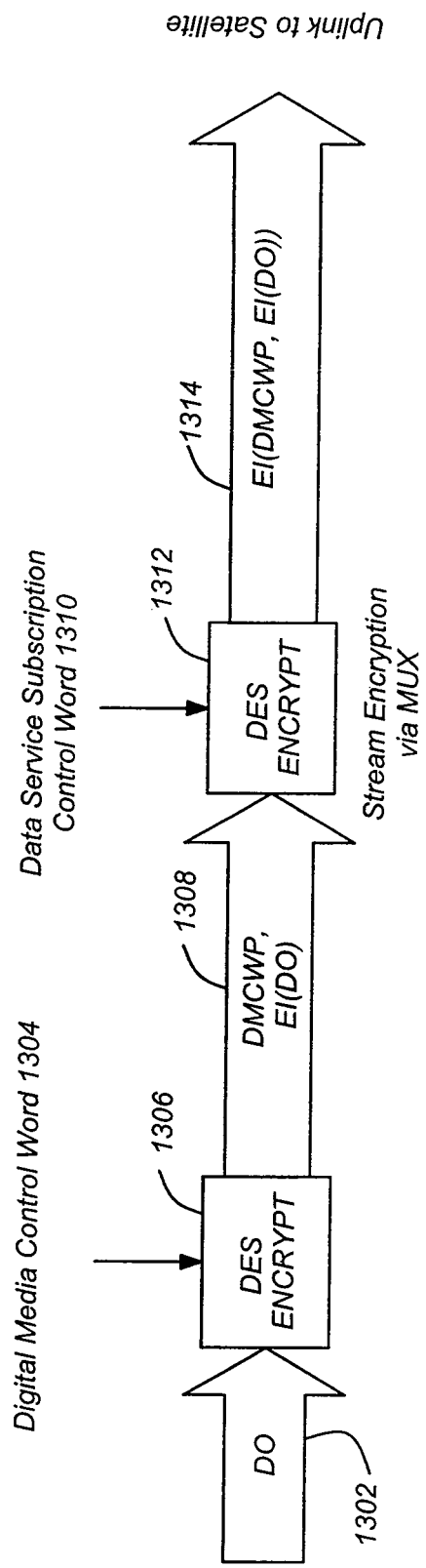
FIG. 13 is a diagram presenting illustrative operations that can be used to purchase or otherwise obtain the right to purchase digital media.

FIG. 13 is a diagram presenting illustrative operations that can be used to purchase or otherwise obtain the right to purchase such digital media. A data object 1302 is provided to the control center 102, where it is encrypted by encryptor 1306 or 218 according to a digital media control word (CW (DM)) 1304 in a way similar to the method used to encrypt the media programs described above with the control words (CWs). The result of this operation is an encrypted version of the data object EI(DO) and one or more digital media control word packets (Digital Media CWPs) 1308. This is further encrypted according to a data service subscription control word (CW(DSS)) 1310 by encryptor 1312. The result is a data service subscription control word packet (CWP(DSS)) and a data object that has been encrypted according to first the digital media control word (CW(DM)) and the data service subscription control word CW(DSS). The double encrypted data object, along with the CWP(DSS), is uplinked to the satellite 108 for transmission to the IRD 132.

Figure 14:
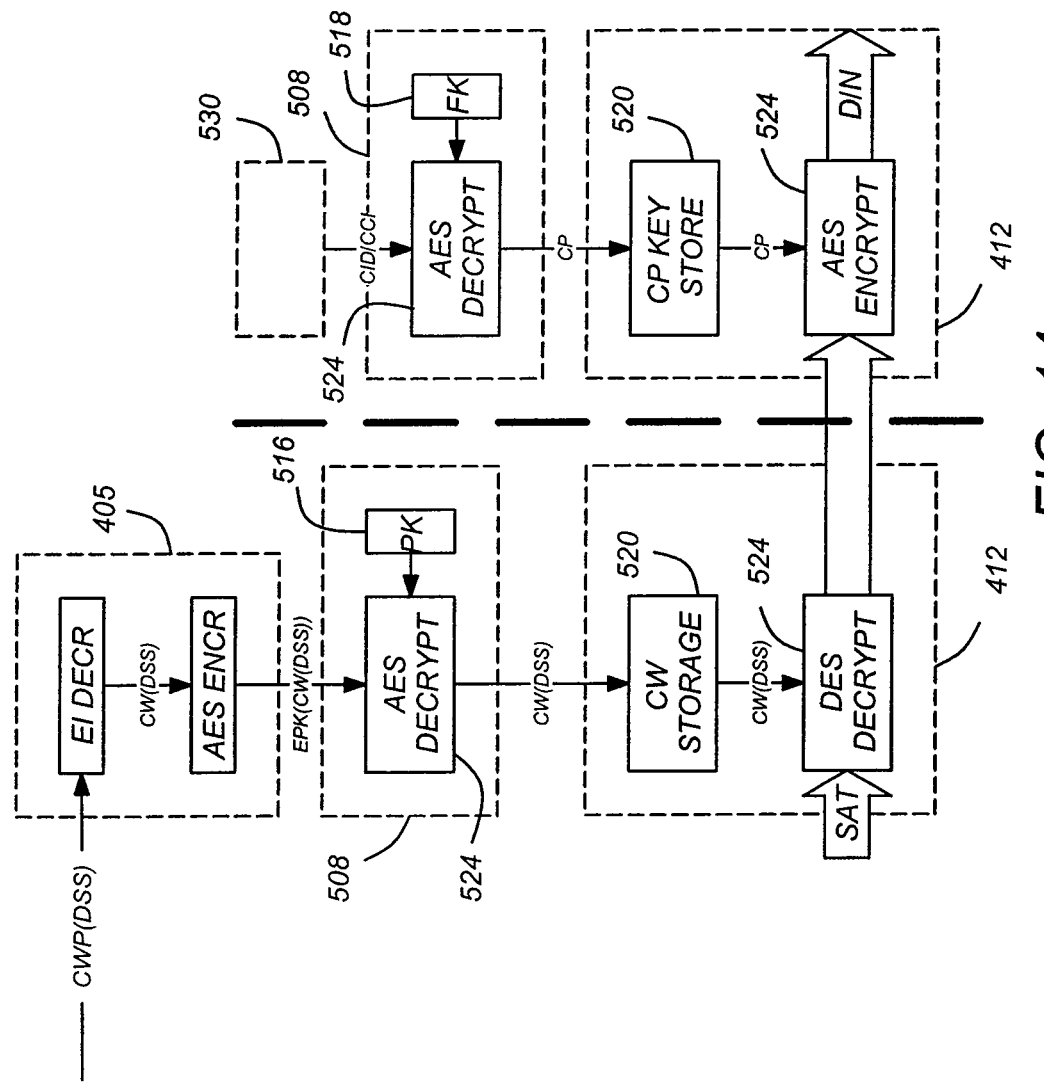
FIG. 14 is a diagram showing how selected IRDs can receive unpurchased encrypted data objects for storage and later retrieval.

FIG. 14 is a diagram showing how selected IRDs 132 can receive unpurchased encrypted data objects for storage and later retrieval. The data service subscription control word packet CWP(DSS) is provided to the CAM 405 via the transport module 412. Using the I/O indecipherable algorithm, the CWP(DSS) is decrypted to produce the data service subscription control words (CW(DSS)). The data service subscription control words (CW(DSS)) are encrypted according to the paring key 516 stored in the CAM 405, and passed to the security module 508 in the IRD 132. The encrypted data subscription control words EPK(CW(DSS)) are then decrypted with the pairing key (PK) 516 by the decryptor 524 in the security module 508, and the digital service subscription control words (DSS(CW)) are cached in storage 520 available to the decryptor 524 in the transport module 412.

The data service subscription control words CW(DSS) are then used to decrypt the data stream to produce digital media control word packets (CWP(DM)) and the data object encrypted by the digital media control words (CW(DM)) (essentially, removing the encryption layer related to the digital service subscription control words (DSS(CW))). After this decryption, the remaining data stream is still encrypted according to the digital media control word (CW(DM)).

The data stream is further encrypted according a copy protection (CP) key generated from the family key 518 and the CID. This further encrypted data stream is then stored in the data storage device or provided to the network 530.

Figure 15:
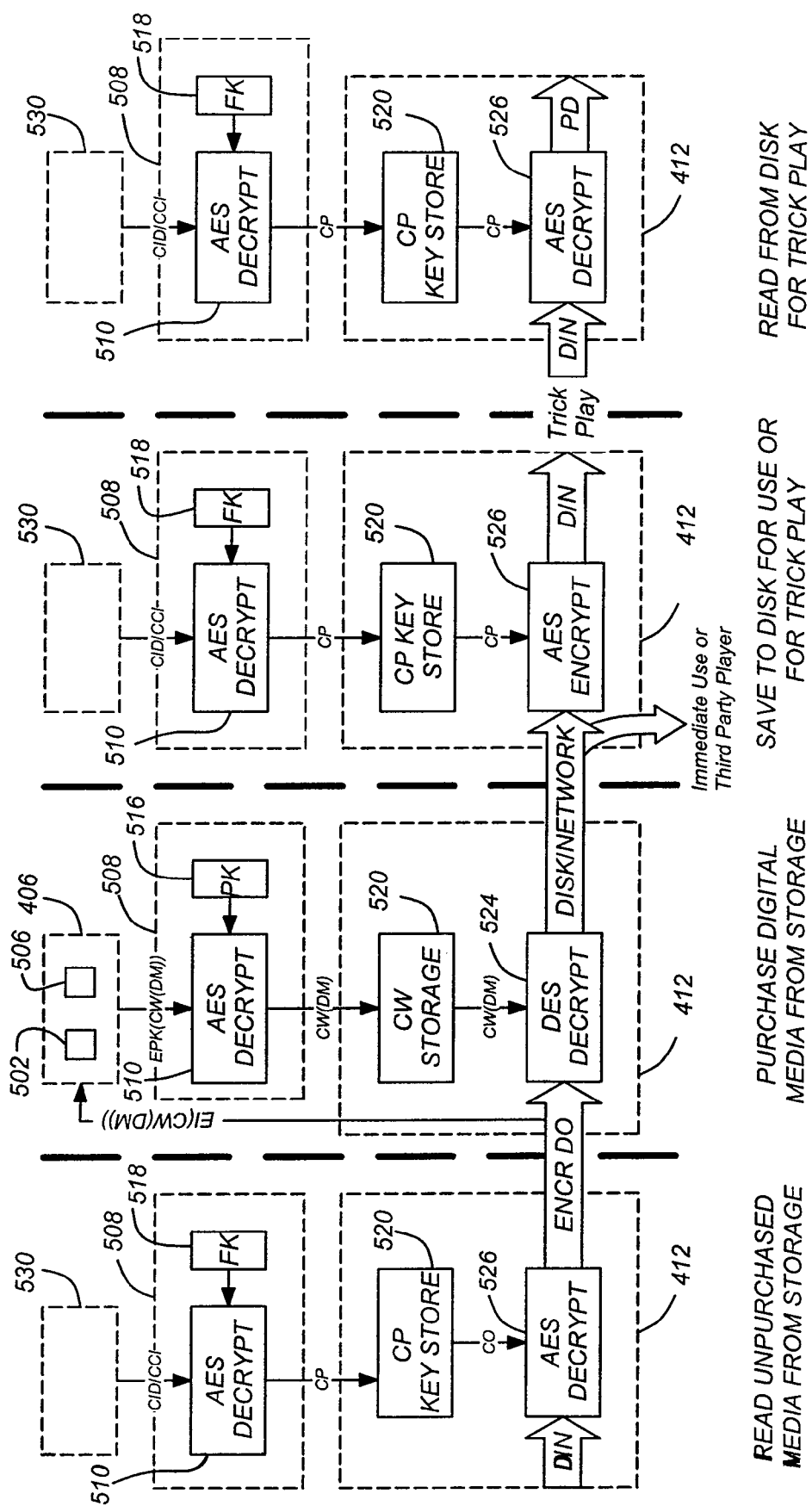
FIG. 15 is a diagram presenting illustrative operations used to purchase and read an unpurchased data object.

FIG. 15 is a diagram presenting illustrative operations used to purchase and read an unpurchased data object. The operations depicted in FIG. 15 are essentially analogous to those depicted in FIG. 12. The encrypted data stream is read from the network or storage device 530, and is decrypted with the copy protection (CP) key (which was generated with the CID and the family key (FK) 518). The result is the data object encrypted according to the digital media control words (CW(DM)) and an encrypted version of the digital media control words EI(CW(DM)). The encrypted version of the digital media control words are provided to the CAM 406, where it is decrypted and re-encrypted according to the pairing key stored in the CAM 406. The re-encrypted digital media control words EPK(CW(EM)) are provided to the security module 508 where they are decrypted to produce the digital media control words CW(DM). The digital media control words CW(DM) are stored or cached in storage 520 in the transport module 412, and are thereafter provided to the decryptor 524. Using these control words, the decryptor 524 produces a plaintext version of the data object, which can be stored on a storage device (i.e. a disk drive) or provided for immediate use to the IRD 132 or communicatively coupled data object presentation device. Just as was illustrated in FIG. 12, if trick play is desired, the data object is encrypted with a CP key before storage, and decrypted using the CP key for replay.

The operations shown in FIG. 12 and FIG. 15 allow the billing information related to the purchase of the PPV program to be securely stored in the CAM 406 where it can be securely recalled and transmitted (via the PSTN, for example) to the control center. However, in many cases, the CAM 406 has limited memory capacity that may be overwhelmed by a number of PPV purchases during a short period of time, thus requiring more frequent transmission of billing information. However, in cases where a number of media programs or data objects are downloaded in a short period of time, it is usually the case that such data objects are of lower value than a typical PPV data object. For example, the foregoing allows the user to download selected songs from an album to assembly a compact disc (CD). But in doing so, the user will request a larger number of lower value data objects (individual songs) instead of a smaller number of higher value data objects (whole albums).

The present invention provides for the purchase and download of data items of lower value without overwhelming the memory of the CAM 406. This is accomplished by storing billing information on the storage device 530.

Figure 16:
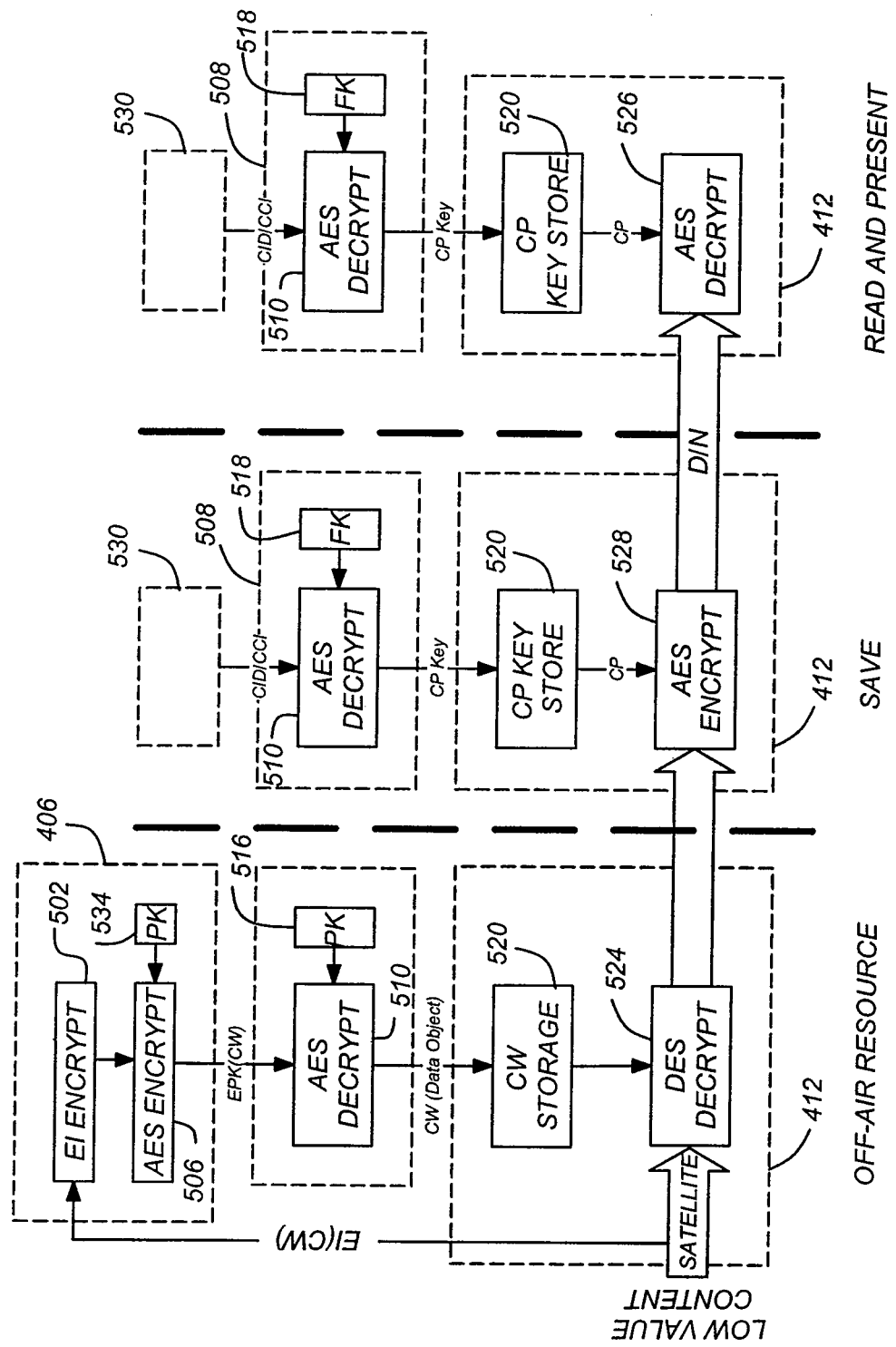
FIG. 16 is a diagram presenting illustrative operations used to receive, store, and replay lower value digital media.

FIG. 16 is a diagram presenting illustrative operations used to receive, store, and replay lower value digital media. The received digital media is encrypted according to the control word (CW). An encrypted control word (EI(CW)) is provided to the CAM 406, where it is decrypted and re-encrypted according to the pairing key (PK). The encrypted control words EPK(CW) are provided from the CAM 406 to the security chip, where the encrypted control words are decrypted to produce the control words (CW), which are cached or stored in the storage 520 in the transport module 412. The media program is then encrypted according to the copy protection (CP) key (using the techniques described above).

When the user wishes to view or otherwise use the media program or data object, the copy protection (CP) key is generated from the CID and the family key, and used to decrypt the encrypted media program. When the CID is accessed, information related to the purchase of the media program is stored so the user can be billed for the use or viewing of the media object.

Unlike the embodiment described in FIG. 15, purchase of the stored media program does not require involvement of the CAM 406. Instead, purchase information is stored is stored in a less secure location than the CAM 406. While the security of the purchase and billing information is reduced in this embodiment, it relieves the CAM 406 from the requirement of storing a large amount of billing information.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of controlling access to a stored media program, comprising the steps of:
   receiving a data stream in a first subscriber receiver at a receiver station having a storage device, the data stream including the media program encrypted according to a media encryption key;
   decrypting the encrypted media program;
   generating a copy protection key in the first subscriber receiver at least in part from a content identifier identifying the media program, the copy protection key for encrypting and decrypting information written to and read from the storage device; and
   encrypting at least a portion of the decrypted data stream using the copy protection key.

2. The method of claim 1, wherein the copy protection key is generated at least in part from a family key, the family key for securely sharing the media program with a second subscriber receiver at the receiver station having access to the family key.

3. The method of claim 2, wherein the content identifier is obtained from a program guide.

4. The method of claim 2, wherein the content identifier is entered by the user.

5. The method of claim 2, wherein the content identifier further comprises copy control information.

6. The method of claim 2, further comprising the step of:
transmitting the encrypted data stream to the second subscriber receiver disposed at the receiver station.

7. The method of claim 6, further comprising the steps of:
generating a copy protection key in the second subscriber receiver from the content identifier and the family key; and
decrypting the encrypted data stream using the copy protection key.

8. The method of claim 7, further comprising the steps of:
accepting a selection of the media program in the second subscriber receiver; and
reading the content identifier associated with the media program from the storage device.

9. The method of claim 7, wherein the copy protection key is generated in a security module in the second subscriber receiver.

10. The method of claim 7, further comprising the step of storing the copy protection key in the second subscriber receiver.

11. The method of claim 7, further comprising the step of providing the decrypted data stream to a presentation device communicatively coupled to the second subscriber receiver.

12. The method of claim 1, further comprising the steps of:
receiving an encrypted family key, the family key for securely sharing the media program with a second subscriber receiver at the receiver station; and
decrypting the encrypted family key using a receiver key substantially uniquely associated with the first subscriber receiver.

13. The method of claim 12, wherein the encrypted family key is received at the first subscriber receiver in response to a service request including a unique identifier of the first subscriber receiver.

14. The method of claim 13, wherein the unique identifier is user-readable.

15. The method of claim 12, wherein the receiver key is user-unreadable.

16. The method of claim 12, further comprising the step of:
generating the copy protection key from the content identifier and the family key; and
decrypting the encrypted data stream using the copy protection key.

17. The method of claim 16, further comprising the steps of:
accepting a selection of the media program; and
reading the content identifier associated with the selected media program.

18. The method of claim 16, wherein the copy protection key is generated from the content identifier and the family key in a security module.

19. The method of claim 16, further comprising the step of storing the copy protection key.

20. The method of claim 19, wherein the copy protection key is stored in a transport module of the first subscriber receiver.

21. The method of claim 16, further comprising the step of:
providing the decrypted data stream to a presentation device.

22. The method of claim 1, wherein the media encryption key is time-variant.

23. The method of claim 1, wherein the copy protection key is stored in a transport module of the first subscriber receiver.

24. The method of claim 1, wherein the data stream includes an encrypted media encryption key (EI(CW)), and the step of decrypting the encrypted media program comprises the steps of:
decrypting the encrypted media encryption key (EI(CW)) to produce the media encryption key (CW);
encrypting the decrypted media encryption key (CW) according to a pairing key;
decrypting the encrypted media encryption key EP(CW) using the pairing key; and
decrypting the media program with the media encryption key (CW).

25. The method of claim 24, wherein:
the step of decrypting the first encryption key EI(CW) and the step of encrypting the decrypted media encryption key (CW) according to the pairing key are performed in a conditional access module removably coupleable to the first subscriber receiver.

26. The method of claim 1, further comprising the steps of:
receiving an encrypted pairing key, the pairing key for cryptographically pairing the first subscriber receiver with a conditional access module removably coupleable with the first subscriber receiver by encrypting communications between the first subscriber receiver and the conditional access module;
decrypting the encrypted pairing key using a receiver key substantially uniquely associated with the first subscriber receiver.

27. The method of claim 26, further comprising the step of:
storing the decrypted pairing key in the first subscriber receiver.

28. The method of claim 26, wherein the encrypted pairing key is received in response to a service request including a unique identifier of the first subscriber receiver.

29. The method of claim 26, wherein the receiver key is unique to the first subscriber receiver.

30. The method of claim 1, further comprising the step of:
storing the encrypted data stream in the storage device.

31. The method of claim 30, further comprising the step of storing the content identifier in the storage device.

32. A method of controlling access to a media program, comprising the steps of:
receiving a data stream in a first subscriber receiver at a receiver station having a storage device, the data stream including the media program encrypted according to a media encryption key (CW) and an encrypted media encryption key (CW);
generating a copy protection key (CP) from a content identifier and a family key in the first subscriber receiver, the copy protection key for encrypting and decrypting information written to and read from the storage device; and
further encrypting the data stream using the copy protection key (CP).

33. The method of claim 32, further comprising the step of:
storing the further encrypted data stream in the storage device.

34. The method of claim 33, further comprising the step of:
storing the copy protection key in a transport module of the first subscriber receiver.

35. The method of claim 33, further comprising the steps of:
receiving an encrypted family key in the first subscriber receiver, the family key for securely sharing the media program with a second subscriber receiver at the receiver station; and decrypting the encrypted family key using a receiver key associated unique to the media program receiver.

36. The method of claim 33, wherein receiver key is user-unreadable.

37. The method of claim 35, wherein the encrypted family key is received in response to a service request including a unique identifier of the first subscriber receiver.

38. The method of claim 35, further comprising the steps of:
generating the copy protection key from the content identifier and the family key;
reading the stored further encrypted data stream;
decrypting the stored further encrypted data stream using the copy protection key to produce the media program encrypted according to the media encryption key (CW) and to produce the encrypted media encryption key;
decrypting the encrypted media encryption key and re-encrypting the media encryption key according to a pairing key;
decrypting the re-encrypted media encryption key using a pairing key to produce the media encryption key (CW); and
decrypting the media program using the first encryption key (CW).

39. The method of claim 38, wherein the media encryption key is decrypted and re-encrypted in a conditional access module removably coupleable to the first subscriber receiver, and the pairing key is stored in the conditional access module.

40. The method of claim 39, wherein the re-encrypted media encryption key is decrypted and stored in the first subscriber receiver.

41. The method of claim 38, further comprising the step of storing the copy protection key in the first subscriber receiver.

42. The method of claim 38, further comprising the steps of:
accepting a selection of the media program in the second subscriber receiver; and
reading the content identifier associated with the media program from the storage device.

43. The method of claim 38, wherein the step of decrypting the re-encrypted media encryption key using a pairing key to produce the media encryption key comprises the steps of:
receiving an encrypted pairing key in the first subscriber receiver, the encrypted pairing key for cryptographically pairing the first subscriber receiver with a conditional access module removably coupleable with the first subscriber receiver by encrypting communications between the first subscriber receiver and the conditional access module; and
decrypting the received encrypted pairing key using a receiver key.

44. The method of claim 43, wherein the encrypted pairing key is received in response to a service request including a unique identifier of the first subscriber receiver.

45. The method of claim 43, further comprising the step of storing the pairing key in the first subscriber receiver.

46. The method of claim 38, further comprising the step of:
providing the decrypted media program to a presentation device.

47. The method of claim 38, further comprising the steps of:
re-encrypting the decrypted media program according to the copy protection key;
storing the re-encrypted media program; and
decrypting the re-encrypted media program according to the copy protection key.

48. The method of claim 47, further comprising the step of:
providing the decrypted media program to a presentation device.

49. The method of claim 47, further comprising the step of:
regenerating the copy protection key from the content identifier and the family key.

50. The method of claim 49, wherein the decrypted media program is re-encrypted in response to at least one of a set of commands requiring re-storage of the media program.

51. The method of claim 50, wherein the set of commands includes a command selected from the group comprising:
a pause command;
a rewind command;
a fast forward command; and
a reverse command.

52. The method of claim 47, further comprising the step of:
providing the decrypted media program to a second subscriber receiver.

53. The method of claim 32, wherein the media encryption key is a time-variant key.

54. The method of claim 32, wherein the content identifier is obtained from a program guide.

55. The method of claim 32, wherein the content identifier is user-entered.

56. The method of claim 32, wherein the content identifier uniquely identifies the media program.

57. The method of claim 32, wherein the content identifier further comprises copy control information.

58. An apparatus for receiving media programs, comprising:
a receiver station, comprising:
a first subscriber receiver, for receiving a data stream transmitting a media program encrypted according to a media encryption key (CW) and an encrypted media encryption key, the first subscriber receiver having:
a first decryptor, for decrypting a message from the conditional access module according to a pairing key (PK), the message comprising the media encryption key (CW); and
a conditional access module, communicatively coupleable to the first subscriber receiver, the conditional access module having:
a second decryptor for decrypting the encrypted media encryption key (CW); and
a first encryptor, for encrypting messages with the receiver according to the pairing key (PK);
wherein the pairing key cryptographically pairs the first subscriber receiver to the conditional access module by encrypting communications between the first subscriber receiver and the conditional access module.

59. The apparatus of claim 58, wherein:
the first subscriber receiver further comprises a secure memory having a receiver key (RK);
data stream further comprises the pairing key (PK) encrypted according to the receiver key (RK); and
the first decryptor further decrypts the encrypted pairing key (PK) with the receiver key (RK) to produce the pairing key (PK).

60. The apparatus of claim 59, wherein
the data stream further comprises a family key (FK) for securely sharing the media program with a second subscriber receiver at the receiver station having access to the family key (FK) wherein the family key is encrypted according to the receiver key (RK); and
the first decryptor further decrypts the encrypted family key (FK) with the receiver key (RK) to produce the family key (FK).

61. The apparatus of claim 60, wherein
the first decryptor generates a copy protection (CP) key from the family key (FK).

62. The apparatus of claim 61, wherein the first subscriber receiver comprises a first encryptor for encrypting the media program according to the copy protection (CP) key and a second decryptor for decrypting the media program according to the copy protection (CP) key.

63. The apparatus of claim 62, further comprising a data storage device coupled to the receiver, the data storage device for storing and retrieving the media program encrypted according to the copy protection (CP) key.

64. An apparatus for controlling access to a stored media program, comprising:
means for receiving a data stream in a first subscriber receiver at a receiver station having a storage device, the data stream including the media program encrypted according to a media encryption key;
means for decrypting the encrypted media program;
means for generating a copy protection key in the first subscriber receiver at least in part from a content identifier identifying the media program, the copy protection key for encrypting and decrypting information written to and read from the storage device; and
means for encrypting the decrypted data stream using the copy protection key.

65. The apparatus of claim 64, further comprising:
means for receiving an encrypted family key, the family key for securely sharing the media program with a second subscriber receiver at the receiver station having access to the family key; and
means for decrypting the encrypted family key using a receiver key substantially uniquely associated with the first subscriber receiver.

66. The apparatus of claim 65, wherein:
the means for generating the copy protection key further generates the copy protection key at least in part from the family key; and
the apparatus further comprises means for decrypting the encrypted data stream using the copy protection key.

67. The apparatus of claim 64, wherein the data stream includes an encrypted media encryption key (EI(CW)), and the means for decrypting the media program comprises:
means for decrypting the encrypted media encryption key (EI(CW)) to produce the media encryption key;
means for encrypting the decrypted media encryption key (CW) according to a pairing key;
means for decrypting the encrypted media encryption key EP(CW) using the pairing key; and
means for decrypting the media program with the media encryption key (CW).

68. The apparatus of claim 64, further comprising:
means for receiving an encrypted pairing key, the pairing key for cryptographically pairing the first subscriber receiver with a conditional access module removably coupleable with the first subscriber receiver by encrypting communications between the first subscriber receiver and the conditional access module; and
means for decrypting the encrypted pairing key using a receiver key substantially uniquely associated with the first subscriber receiver.

69. An apparatus of controlling access to a media program, comprising:
means for receiving a data stream in a first subscriber receiver at a receiver station having a storage device, the data stream including the media program encrypted according to a media encryption key (CW) and an encrypted media encryption key (CW);
means for generating a copy protection key from a content identifier and a family key in the first subscriber receiver, the copy protection key for encrypting and decrypting information written to and read from the storage device;
means for further encrypting the data stream using the copy protection key (CP); and
means for storing the copy protection key (CP) in the receiver.

70. The apparatus of claim 69, further comprising:
means for receiving an encrypted family key in the first subscriber receiver, the family key for securely sharing the media program with a second subscriber receiver at the receiver station; and
means for decrypting the encrypted family key using receiver key associated unique to the media program receiver.

71. The apparatus of claim 70, further comprising:
means for generating the copy protection key from the content identifier and the family key;
means for reading the stored further encrypted data stream;
means for decrypting the stored further encrypted data stream using the copy protection key to produce the media program encrypted according to the media encryption key (CW) and to produce the encrypted media encryption key;
means for decrypting the encrypted media encryption key and re-encrypting the media encryption key according to a pairing key;
means for decrypting the re-encrypted media encryption key using a pairing key to produce the media encryption key (CW); and
means for decrypting the media program using the first encryption key (CW).

72. The apparatus of claim 71, further comprising:
means for accepting a selection of the media program in the second subscriber receiver; and
means for reading the content identifier associated with the media program from the storage device.

73. The apparatus of claim 71, wherein the means for decrypting the re-encrypted media encryption key according to a pairing key to produce the media encryption key comprises:
means for receiving an encrypted pairing key in the first subscriber receiver, the encrypted pairing key for cryptographically pairing the first subscriber receiver with a conditional access module removably coupleable with the first subscriber receiver by encrypting communications between the first subscriber receiver and the conditional access module; and
means for decrypting the received encrypted pairing key using a receiver key to generate the pairing key.

74. The apparatus of claim 71, further comprising:
means for providing the decrypted media program to a presentation device.

75. The apparatus of claim 71, further comprising:
means for re-encrypting the decrypted media program according to the copy protection key;
means for storing the re-encrypted media program; and
means for decrypting the re-encrypted media program according to the copy protection key.

76. The apparatus of claim 75, further comprising:
means for regenerating the copy protection key from the content identifier and the family key.

77. The apparatus of claim 76, wherein the decrypted media program is re-encrypted in response to at least one of a set of commands requiring re-storage of the media program.

78. A system for transmitting and receiving media programs, comprising:
- a transmitter, for transmitting a data stream having a media program encrypted according to a media encryption key (CW) and an encrypted media encryption key;
- a subscriber receiver, for receiving the transmitted data stream, the subscriber receiver having:
  - a first decryptor, for decrypting a message from the conditional access module according to a pairing key (PK), the message comprising the media encryption key (CW);
- a conditional access module, communicatively coupleable to the subscriber receiver, the conditional access module having
  - a second decryptor for decrypting the encrypted media encryption key (CW); and
  - a first encryptor, for encrypting messages with the receiver according to the pairing key (PK);
- wherein the pairing key cryptographically pairs the first subscriber receiver to the conditional access module by encrypting communications between the first subscriber receiver and the conditional access module.

* * * * *